(12) United States Patent
Kawamura

(10) Patent No.: US 11,556,285 B2
(45) Date of Patent: Jan. 17, 2023

(54) VERIFICATION SYSTEM, INFORMATION PROCESSING APPARATUS, AND CONTROL METHODS THEREOF

(71) Applicant: CANON KABUSHIKI KAISHA, Tokyo (JP)

(72) Inventor: Nobuhiro Kawamura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/340,176

(22) Filed: Jun. 7, 2021

(65) Prior Publication Data
US 2021/0405936 A1 Dec. 30, 2021

(30) Foreign Application Priority Data
Jun. 30, 2020 (JP) .............................. JP2020-113192

(51) Int. Cl.
*G06F 3/12* (2006.01)
*G06T 7/00* (2017.01)

(52) U.S. Cl.
CPC ............ *G06F 3/1208* (2013.01); *G06F 3/121* (2013.01); *G06F 3/1254* (2013.01); *G06F 3/1255* (2013.01); *G06F 3/1256* (2013.01); *G06F 3/1257* (2013.01); *G06F 3/1258* (2013.01); *G06T 7/001* (2013.01); *G06F 3/12* (2013.01); *G06T 2207/30144* (2013.01)

(58) Field of Classification Search
CPC ...... G06F 3/1208; G06F 3/121; G06F 3/1254; G06F 3/1255; G06F 3/1256; G06F 3/1257; G06F 3/1258; G06F 3/1211; G06F 3/1253; G06F 3/1279; G06F 3/1282; G06F 3/1285; G06F 3/1239; G06F 3/12; G06T 7/001; G06T 2207/30144
USPC ....................................................... 358/1.15
See application file for complete search history.

(56) References Cited

U.S. PATENT DOCUMENTS

| | | | |
|---|---|---|---|
| 10,599,961 B2 | 3/2020 | Toriyabe et al. | |
| 2004/0190057 A1* | 9/2004 | Takahashi | G06F 3/1205 358/1.15 |
| 2013/0223866 A1 | 8/2013 | Kazama et al. | |
| 2016/0142569 A1* | 5/2016 | Akuzawa | H04N 1/00408 715/734 |

FOREIGN PATENT DOCUMENTS

JP 2013-171570 A 9/2013

* cited by examiner

*Primary Examiner* — Darryl V Dottin
(74) *Attorney, Agent, or Firm* — Venable LLP

(57) ABSTRACT

A verification system includes a printer which prints image on a recording sheet, a reader which reads an image printed on the recording sheet, and controllers to set a first print setting via a setting screen, cause the printer to print an image based on the set first print setting, cause the reader to read the printed image, and register the read image as a correct image. The controllers also set a second print setting via the setting screen, cause the printer to print an verification target image based on the set second print setting, cause the reader to read the printed verification target image, and verify the read image using the registered correct image, and control the setting screen for the second print setting so that a predetermined print setting included in the first print setting cannot be edited on the setting screen for the second print setting.

17 Claims, 18 Drawing Sheets

FIG. 6

READING CORRECT IMAGE...
PLEASE PRINT CORRECT IMAGE

NUMBER OF SHEETS PER COPY

1 SHEET

SURFACE ON WHICH TO PERFORM VERIFICATION

- ☑ BOTH SIDES
- ☐ ONLY FRONT SIDE
- ☐ ONLY BACK SIDE

CANCEL

FIG. 7

CORRECT IMAGE REGISTRATION

INVOICE

| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |

READING HAS BEEN COMPLETED.
REGISTER AS CORRECT IMAGE?

SET VERIFICATION SKIP REGION

REGISTER

CANCEL

 1/1 SHEET  FRONT 

FIG. 10
VERIFICATION RESULT
| TIME | 3/6 10:10 |
|---|---|
| JOB NAME | INVOICE |
| NUMBER OF VERIFIED SHEETS | 1000 SHEETS |
| NUMBER OF SHEETS THAT ARE OK | 986 SHEETS |
| NUMBER OF SHEETS THAT ARE NOT OK | 14 SHEETS |
PREVIOUS JOB   1/9 JOBS  NEXT JOB   OK
FIG. 11
VERIFYING...
INVOICE
1ST OF 89TH COPY
DETERMINATION RESULT: OK
READ IMAGE
END VERIFICATION
CONFIRM VERIFICATION RESULT OF ENTIRE JOB

FIG. 20

PRINT SETTING

| | | | |
|---|---|---|---|
| PAGE RANGE: | 1-15 (2002) | NUMBER OF COPIES: | 10 (2003) |
| SHEET FEEDING UNIT: | AUTOMATIC (2004) | SINGLE-SIDED/ DOUBLE-SIDED: | SINGLE-SIDED PRINTING (2005) |
| TYPE OF SHEET: | PLAIN PAPER (2006) | PRINTING DIRECTION: | VERTICAL (2007) |
| JOB ANNOTATION MEMO: | MEMO (2008) | BINDING POSITION: | TOP LEFT (2009) |

OK (2010)   CANCEL (2011)

2001

VERIFICATION SYSTEM, INFORMATION PROCESSING APPARATUS, AND CONTROL METHODS THEREOF

BACKGROUND OF THE INVENTION

Field of the Invention

The present invention relates to a verification system, an information processing apparatus, and control methods thereof.

Description of the Related Art

Verification apparatuses that verify quality by reading printed materials that have been printed by a printing apparatus are known. Verification apparatuses can detect image defects such as blots and missing prints, text errors, barcode quality, and the like. It is possible to sort products in which defects have been detected and non-defective printed materials by, for example, changing discharge destinations.

Verification apparatuses preregister a correct image and verify an image to be verified by comparing that correct image and the image to be verified. With regard to correct images, digital data such as PDF may be used, for example; however, there are cases where a scanned image of a non-defective image that has once been printed is used. The reason for this is that since an image to be verified is a printed material, a data format can be made to match that of a correct image, thereby enabling expectation for verification certainty and eliminating a need for data conversion.

In order to cross-reference an image to be verified in verification apparatuses, it is necessary to specify and verify against a correct image that matches the image to be verified. However, it is common for printed materials that are generated in a printing apparatus to be outputted while changing the printed side and the print order in accordance with a desired printing setting, various sheet discharge apparatus characteristics, and the like. In other words, unless printing is performed under a condition that is the same as that when a correct image was generated, there are cases where images of different printing surfaces are compared due to a print order or the like becoming misaligned; and in such cases, there is a high possibility that an expected comparison result may not be obtained. Accordingly, Japanese Patent Laid-Open No. 2013-171570 discloses a technique for aligning a page of an image to be verified and a page of a correct image that are used in cross-referencing even in a case where an order of images to be printed are changed.

However, there is a problem in the foregoing conventional technique as is described below. For example, in the foregoing conventional technique, in order to cope with a change of print order, it is necessary to align a page of an image to be verified and a page of a correct image by sending to a printing apparatus setting data, such as a printing condition, before printing. Also, although it is possible to cope with a simple change of a print order, sheet inversion that accompanies a finishing apparatus or a sheet discharge apparatus and the like are not considered. Furthermore, in a case where, for example, a setting change that affects the appearance of color of an image or a setting change that relates to a type or size of sheet is made, there are cases where an image is determined to not match as a result of cross-referencing against a correct image.

SUMMARY OF THE INVENTION

The present invention enables realization of a mechanism that suitably prints an image to be verified under a condition that is the same as that of when a correct image was generated with regard to a printing condition that affects a verification result among printing conditions for when the correct image was generated.

One aspect of the present invention provides a verification system comprising: setting unit configured to be able to set one or more printing conditions; printing unit configured to print an image onto a sheet; reading unit configured to read an image of a sheet; storage unit configured to store print data and printing conditions set by the setting unit; registration unit configured to read by the reading unit an image on a sheet printed by the printing unit based on the print data in accordance with the printing conditions and register the read image as a correct image for performing verification of a printed image; editing unit configured to edit the printing conditions; verification unit configured to compare with the correct image and verify a read image of an image on a sheet printed by the printing unit based on the print data in accordance with the printing conditions edited by the editing unit; and restriction unit configured to restrict editing by the editing unit with regard to a printing condition of a predetermined item among the one or more printing conditions which can be set.

Another aspect of the present invention provides an information processing apparatus operable to be connected to a printing apparatus, the information processing apparatus comprising: at least one memory device that stores a set of instructions; and at least one processor that executes the set of instructions to: set one or more printing conditions with regard to a print job for which printing is performed by the printing apparatus; store print data and a set printing condition; edit the printing condition; compare with a correct image and verify a read image of an image on a sheet printed by the printing apparatus based on the print data in accordance with the edited printing condition; and restrict the editing with regard to a printing condition of a predetermined item among the one or more printing conditions.

Still another aspect of the present invention provides a control method of a verification system that comprises a printing unit that prints an image onto a sheet and a reading unit that reads an image of a sheet; the method comprising: setting one or more printing conditions; storing print data and the set printing conditions; reading by the reading unit an image on a sheet printed by the printing unit based on the print data in accordance with the printing conditions and registering the read image as a correct image for performing verification of a printed image; editing the printing condition; comparing with the correct image and verifying a read image of an image on a sheet printed by the printing unit based on the print data in accordance with the edited printing condition; and restricting the editing with regard to a printing condition of a predetermined item among the one or more printing conditions which can be set.

Yet still another aspect of the present invention provides a method for controlling an information processing apparatus connected to a printing apparatus, the method comprising: setting one or more printing conditions with regard to a print job for which printing is performed by the printing apparatus; storing print data and a set printing condition; editing the printing condition; comparing with a correct image and verifying a read image of an image on a sheet printed by the printing apparatus based on the print data in accordance with the edited printing condition; and restricting the editing with regard to a printing condition of a predetermined item among the one or more printing conditions.

Further features of the present invention will be apparent from the following description of exemplary embodiments with reference to the attached drawings.

BRIEF DESCRIPTION OF THE DRAWINGS

FIG. 6 is a view illustrating an example of a display screen while the verification apparatus is reading the correct image according to the embodiment.

FIG. 7 is a view illustrating an example of a display screen after the verification apparatus has read the correct image according to the embodiment.

FIG. 10 is a view illustrating an example of a display screen for when displaying a verification result from the verification apparatus according to the embodiment.

FIG. 11 is a view illustrating an example of a display screen for when the verification apparatus has determined that verification is OK according to the embodiment.

FIG. 20 is a view illustrating an example of the print setting screen in which everything other than items for which settings can be changed is set to uneditable according to the embodiment.

DESCRIPTION OF THE EMBODIMENTS

Figure 1:
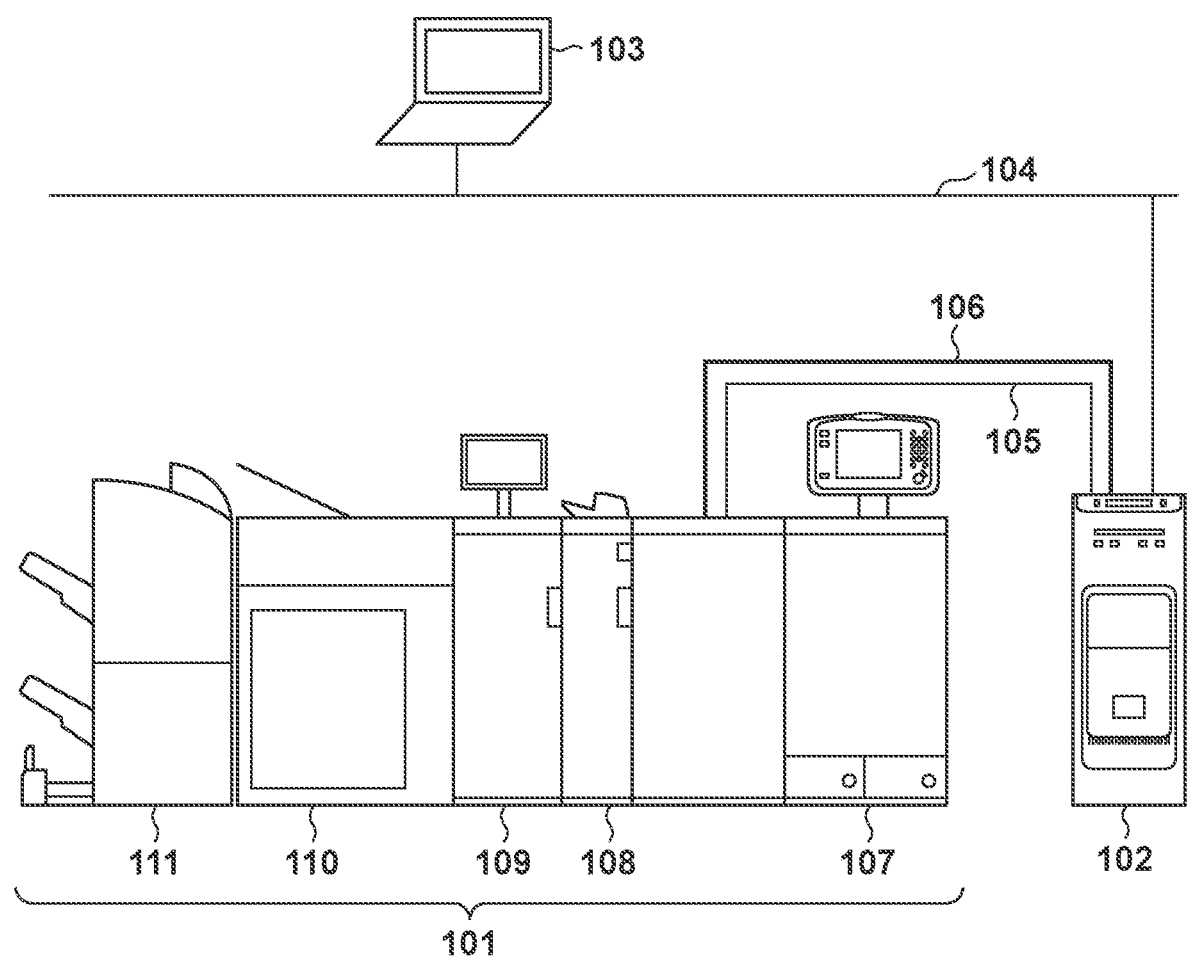
FIG. 1 is a view illustrating an overall configuration of a verification system according to an embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

<Overall Configuration of System>

Hereinafter, an embodiment of the present invention will be described. First, a hardware configuration of a verification system according to the present embodiment will be described with reference to FIG. 1. The present verification system is configured to include an image forming apparatus 101, an external controller (information processing apparatus) 102, and a PC 103. The image forming apparatus 101 and the external controller 102 are connected to be capable of communicating with each other via an internal LAN 105 and a video cable 106. The external controller 102 and the PC 103, which is a client PC, are connected to be capable of communicating with each other via an external LAN 104, and a print instruction is performed in relation to the external controller 102 from the PC 103.

In the PC 103, a printer driver that has a function of converting print data to a print description language that can be processed in the external controller 102 is installed. A user that performs printing can perform a print instruction via the printer driver from various applications. The printer driver transmits print data to the external controller 102 based on a print instruction from the user. The external controller 102, when it receives a print instruction from the PC 103, performs data analysis and image processing such as rasterization processing and performs the print instruction by inputting print data into the image forming apparatus 101.

Next, the image forming apparatus 101 will be described. A plurality of apparatuses that have different functions are connected to the image forming apparatus 101 and are configured to be capable of complicated print processing such as bookbinding. Specifically, the image forming apparatus 101 comprises a printing apparatus 107, an inserter 108, a verification apparatus 109, a large capacity stacker 110, and a finisher 111. Note that these configurations are an example and are not intended to limit the present invention, and an apparatus that has another function may be additionally or alternatively arranged.

The printing apparatus 107 forms an image using toner in relation to a sheet that is conveyed from a sheet feeding unit arranged in a lower portion of the printing apparatus 107. A configuration and an operation principle of this printing apparatus 107 are as follows. An exposure unit emits light that has been modulated in accordance with image data such as a laser beam. That light is reflected by a rotating polygonal mirror such as a polygonal mirror and is emitted as a scanning beam onto a photosensitive drum. An electrostatic latent image that has been formed on the photosensitive drum by this laser beam is developed by toner, and that toner image is transferred onto a sheet that is attached to a transfer drum. By sequentially executing this sequence of an image forming process for yellow (Y), magenta (M), cyan (C), and black (K) toners, a full color image is formed on the sheet.

The sheet on the transfer drum on which a full color image has been formed is conveyed to a fixing device. The fixing device includes a roller, a belt, and the like, incorporates a heat source such as a halogen heater within the roller, and causes the toner on the sheet on which the toner images have been transferred to be fixed to the sheet by melting the toner using heat and pressure.

The inserter 108 inserts an insertion sheet into a group of sheets of a printed material. The inserter 108 can insert a sheet at a desired position with respect to a group of sheets that have been printed in the printing apparatus 107 and then conveyed. The verification apparatus 109 is an apparatus for determining whether or not a printed image is normal by reading and comparing an image of a conveyed sheet to a preregistered correct image. The large capacity stacker 110 is a stacker on which a large number of sheets can be stacked. The finisher 111 is a post-processing apparatus that performs finishing processing on a conveyed sheet. The finisher 111 can perform finishing such as stapling, punching, saddle stitch binding as finishing processing and discharges processed sheets onto a discharge tray.

The above-described verification system is a configuration in which the external controller 102 is connected to the image forming apparatus 101; however, there is no intent to limit the present invention to such a form to which the external controller 102 is connected. In other words, configuration may be such that the image forming apparatus 101 is connected to the external LAN 104 and print data that the image forming apparatus 101 can process is transmitted from the PC 103. In this case, the image forming apparatus 101 performs data analysis and rasterization processing and then executes print processing. In other words, configuration may be taken so as to integrate the image forming apparatus 101 and the external controller 102.

<Hardware Configuration of System>

Figure 2:
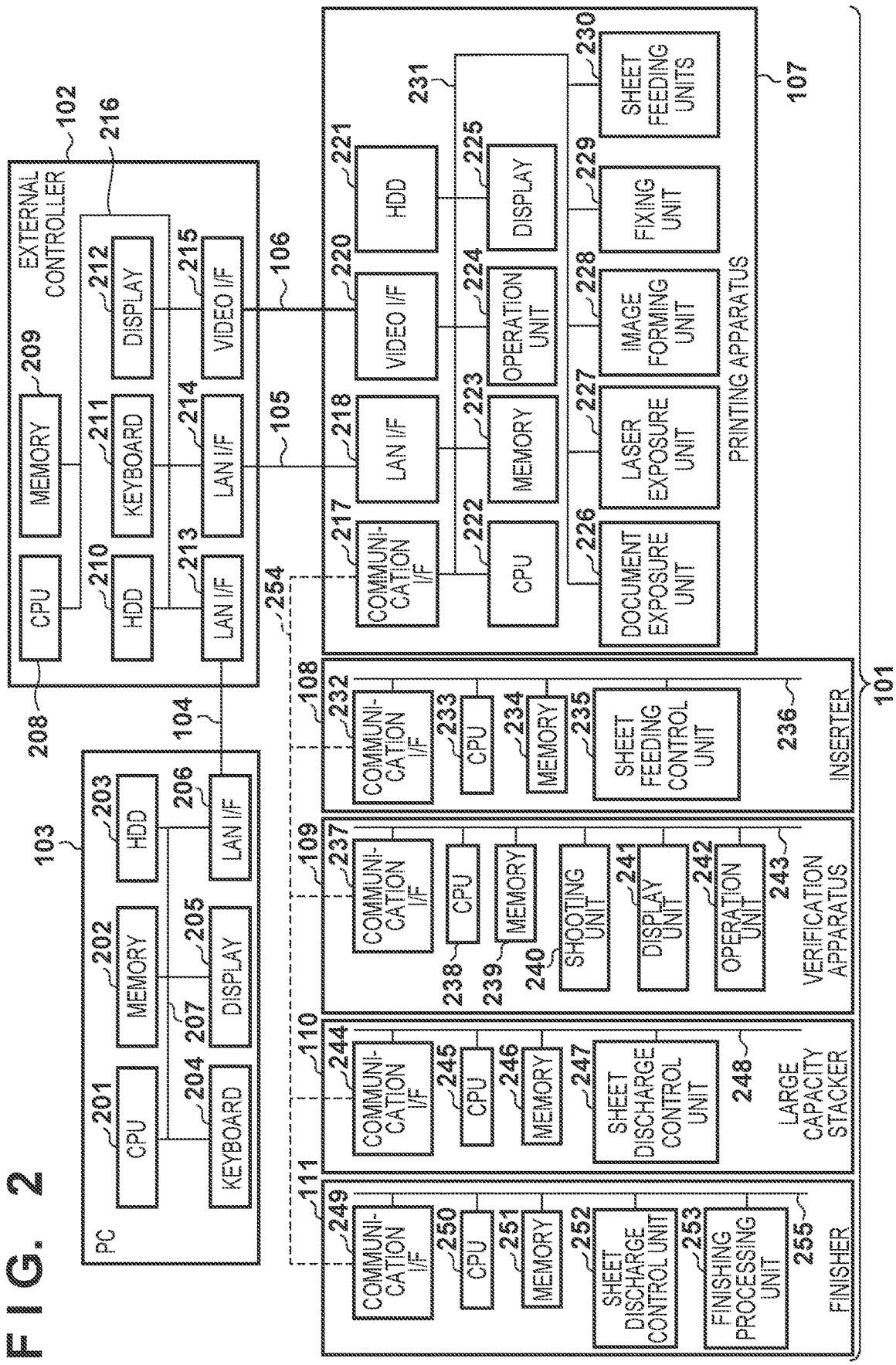
FIG. 2 is a block diagram illustrating a hardware configuration of a verification system according to the embodiment.

Next, an example of a hardware configuration of the image forming apparatus 101, the external controller 102, and the PC 103 in the verification system according to the present embodiment will be described with reference to FIG. 2.

First, a configuration of the printing apparatus 107 of the image forming apparatus 101 will be described. The printing apparatus 107 of the image forming apparatus 101 comprises a communication I/F 217, a LAN I/F 218, a video I/F 220, an HDD 221, a CPU 222, a memory 223, an operation unit 224, and a display 225. Furthermore, the printing apparatus 107 comprises a document exposure unit 226, a laser exposure unit 227, an image forming unit 228, a fixing unit 229, and sheet feeding units 230. The respective configuration elements are connected via a system bus 231.

The communication I/F 217 is connected to the inserter 108, the verification apparatus 109, the large capacity stacker 110, and the finisher 111 via a communication cable 254, and communication for control of the respective apparatuses is performed. The LAN I/F 218 is connected to the external controller 102 via the internal LAN 105, and communication of print data and the like is performed. The video I/F 220 is connected to the external controller 102 via the video cable 106, and communication of image data and the like is performed.

The HDD 221 is a storage apparatus in which programs and data are stored. The CPU 222 comprehensively performs image processing control and print control based on the programs and the like stored in the HDD 221. The memory 223 stores programs and image data, which will be necessary when the CPU 222 performs various kinds of processing, and operates as a work area. The operation unit 224 accepts input of various settings and operation instructions from the user. The display 225 displays setting information of the printing apparatus 107, a processing status of a print job, and the like.

The document exposure unit 226 performs processing for reading a document when using a copy function or a scan function. The document exposure unit 226 reads document data by shooting an image using a CCD camera while illuminating an exposure lamp onto a sheet that has been provided by the user. The laser exposure unit 227 is an apparatus that performs primary charging, which is for irradiating the photosensitive drum with a laser beam in order to transfer a toner image, and laser exposure. The laser exposure unit 227 first performs primary charging which charges the surface of the photosensitive drum to an even negative potential. Then, a laser beam from the laser exposure unit 227 is emitted onto the photosensitive drum while adjusting the angle of reflection using a polygonal mirror. By this, a negative charge of a portion on which emission has been performed is neutralized, and an electrostatic latent image is formed.

The image forming unit 228 is an apparatus for transferring toner onto a sheet, is configured by a development unit, a transfer unit, a toner replenishment unit, and the like, and transfers toner that is on the photosensitive drum onto a sheet. In the developing unit, toner that has been negatively charged is applied onto an electrostatic latent image on the surface of the photosensitive drum from a development cylinder and visualizes the image. In the transfer unit, a primary transfer in which a positive electric potential is applied to a primary transfer roller and the toner on the surface of the photosensitive drum is transferred to the transfer belt and a secondary transfer in which a positive electric potential is applied to a secondary transfer outer roller and the toner on the transfer belt is transferred onto a sheet are performed. The fixing unit 229 is an apparatus for melting and fixing onto a sheet the toner on the sheet using heat and pressure and is configured by a heater, a fixing belt, a pressure belt, and the like. The sheet feeding units 230 are apparatuses for feeding a sheet, and a sheet feeding operation and a conveyance operation of a sheet are controlled by rollers and various sensors.

Next, a configuration of the inserter 108 of the image forming apparatus 101 will be described. The inserter 108 of the image forming apparatus 101 is configured to include a communication I/F 232, a CPU 233, a memory 234, and a sheet feeding control unit 235, and the respective configuration elements are connected via a system bus 236. The communication I/F 232 is connected with the printing apparatus 107 via the communication cable 254, and communication that is necessary for control is performed. The CPU 233 performs various kinds of control that are necessary for sheet feeding in accordance with control programs stored in the memory 234. The memory 234 is a storage apparatus that stores control programs. The sheet feeding control unit 235 controls sheet feeding and conveyance of a sheet that has been conveyed from a sheet feeding unit of the inserter 108 or the printing apparatus 107 while controlling rollers and sensors based on instructions from the CPU 233.

Next, a configuration of the verification apparatus 109 of the image forming apparatus 101 will be described. The verification apparatus 109 of the image forming apparatus 101 is configured to include a communication I/F 237, a CPU 238, a memory 239, a shooting unit 240, a display unit 241, and an operation unit 242, and the respective configuration elements are connected via a system bus 243. The communication I/F 237 is connected with the printing apparatus 107 via the communication cable 254, and communication that is necessary for control is performed. The CPU 238 performs various kinds of control that are necessary for verification in accordance with control programs stored in the memory 239. The memory 239 is a storage apparatus that stores control programs. The shooting unit 240 shoots a conveyed sheet based on an instruction of the CPU 238. The CPU 238 compares an image that has been shot by the shooting unit 240 and a correct image that is stored in the memory 239 and determines whether a printed image is normal. The display unit 241 displays a verification result, a setting screen, and the like. The operation unit 242 is operated by the user and accepts instructions such as a setting change of the verification apparatus 109 and registration of a correct image.

Next, a configuration of the large capacity stacker 110 of the image forming apparatus 101 will be described. The large capacity stacker 110 of the image forming apparatus 101 is configured to include a communication I/F 244, a CPU 245, a memory 246, and a sheet discharge control unit 247, and the respective configuration elements are connected via a system bus 248. The communication I/F 244 is connected with the printing apparatus 107 via the communication cable 254, and communication that is necessary for control is performed. The CPU 245 performs various kinds of control that are necessary for sheet discharge in accordance with control programs stored in the memory 246. The memory 246 is a storage apparatus that stores control programs. The sheet discharge control unit 247 performs control for conveying a conveyed sheet to a stack tray, an escape tray, or the subsequent finisher 111 based on instructions from the CPU 245.

Next, a configuration of the finisher 111 of the image forming apparatus 101 will be described. The finisher 111 of the image forming apparatus 101 is configured to include a communication I/F 249, a CPU 250, a memory 251, a sheet discharge control unit 252, and a finishing processing unit 253, and the respective configuration elements are connected via a system bus 255. The communication I/F 249 is connected with the printing apparatus 107 via the communication cable 254, and communication that is necessary for control is performed. The CPU 250 performs various kinds of control that are necessary for finishing and sheet discharge in accordance with control programs stored in the memory 251. The memory 251 is a storage apparatus that stores control programs. The sheet discharge control unit 252 controls sheet conveyance and discharge based on instructions from the CPU 250. The finishing processing unit 253 controls finishing processing such as stapling, punching, or saddle stitch binding based on instructions from the CPU 250.

Next, a configuration of the external controller 102 will be described. The external controller 102 is configured to include a CPU 208, a memory 209, an HDD 210, a keyboard 211, a display 212, a LAN I/F 213, a LAN I/F 214, and a video I/F 215. The respective configuration elements are connected via a system bus 216. The CPU 208 comprehensively executes processing such as reception of print data from the PC 103, RIP processing, transmission of print data to the image forming apparatus 101 based on programs and data that are stored in the HDD 210. The memory 209 stores programs and data, which will be necessary when the CPU 208 performs various kinds of processing, and operates as a work area. The HDD 210 stores programs and data necessary for operation such as print processing. The keyboard 211 is an apparatus for inputting operation instructions of the external controller 102. The display 212 displays information such as an execution application of the external controller 102 using a still image and/or a video signal of a video. The LAN I/F 213 is connected to the PC 103 via the external LAN 104, and communication of a print instruction and the like is performed. The LAN I/F 214 is connected to the image forming apparatus 101 via the internal LAN 105, and communication of a print instruction and the like is performed. The video I/F 215 is connected to the image forming apparatus 101 via the video cable 106, and communication of print data and the like is performed.

Next, a configuration of the PC 103 will be described. The PC 103 is configured to include a CPU 201, a memory 202, an HDD 203, a keyboard 204, a display 205, and a LAN I/F 206, and the respective configuration elements are connected via a system bus 207. The CPU 201 creates print data or executes a print instruction based on a document processing program and the like stored in the HDD 203. Also, the CPU 201 comprehensively controls the respective devices that are connected to the system bus 207. The memory 202 stores programs and data, which will be necessary when the CPU 201 performs various kinds of processing, and operates as a work area. The HDD 203 stores programs and data necessary for operation such as print processing. The keyboard 204 is an apparatus for inputting operation instructions that are related to the PC 103. The display 205 displays information such as an execution application of the PC 103 using a still image and/or a video signal of a video. The LAN I/F 206 is connected to the external LAN 104, and communication of a print instruction and the like are performed.

As described above, the internal LAN 105 and the video cable 106 are connected to the external controller 102 and the image forming apparatus 101; however, it is sufficient so long as configuration is that in which data transmission/reception necessary for printing can be performed, and for example, configuration of connection may be that of only a video cable. Also, it is sufficient that each of the memory 202, the memory 209, the memory 223, the memory 234, the memory 239, the memory 246, and the memory 251 be a storage device that stores data and programs. For example, configuration may be taken so as to substitute using a volatile RAM, a non-volatile ROM, a built-in HDD, an external HDD, a USB memory, or the like.

<Sheet Conveyance Control>

Figure 3:
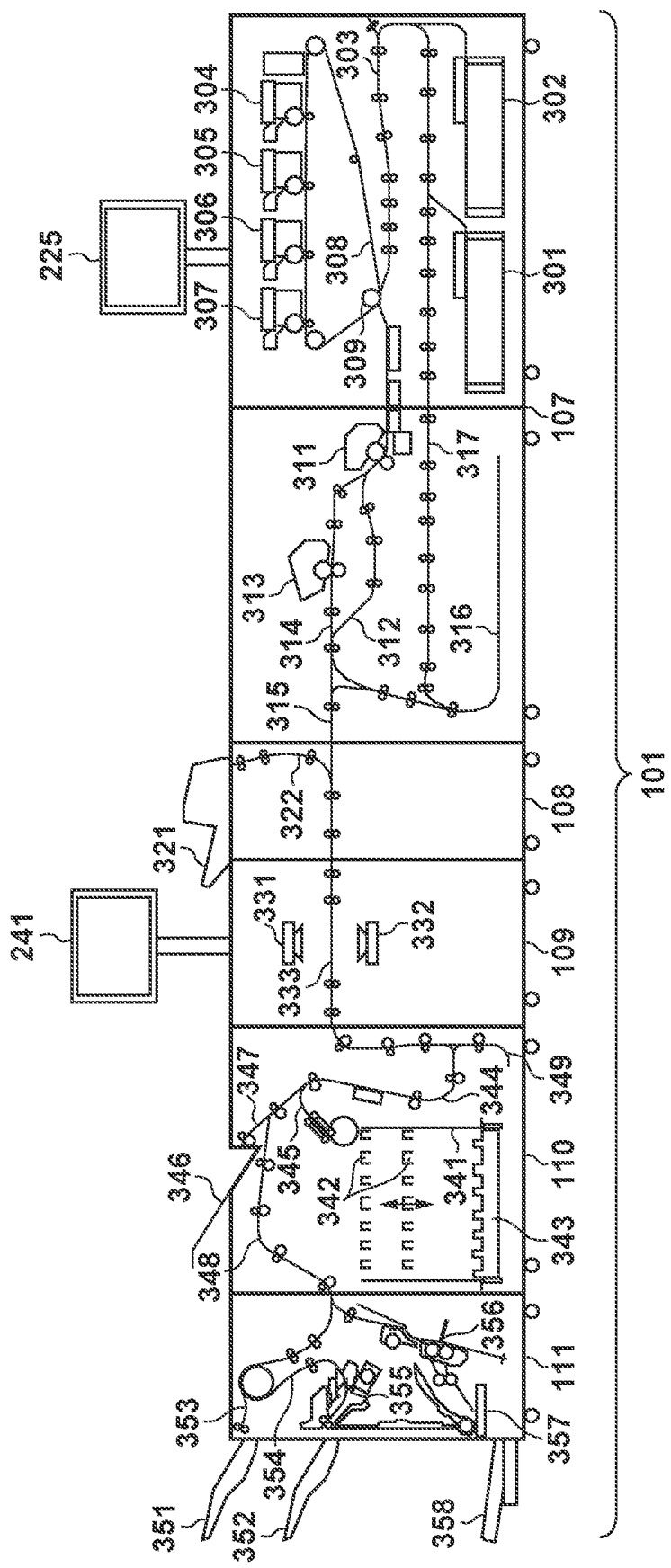
FIG. 3 is a view illustrating a cross-sectional view of an image forming apparatus according to the embodiment.

Next, sheet conveyance control according to the present embodiment will be described with reference to FIG. 3. FIG. 3 schematically illustrates a cross section of the image forming apparatus 101. The display apparatus 225 displays a print status and information for setting of the image forming apparatus 101. Reference numerals 301 and 302 of the printing apparatus 107 are sheet feeding decks. It is possible to store each type of sheet in each sheet feeding deck. In each sheet feeding deck, it is possible to separate one sheet at the uppermost of the stored sheets and convey to a sheet conveyance path 303. Reference numerals 304 to 307 are development stations and form toner images using the respective Y, M, C, and K colored toners in order to form a color image. The toner images that have been formed here are primary transferred onto an intermediate transfer belt 308. The intermediate transfer belt 308 rotates in a clockwise direction in the figure, and at a secondary transfer position 309, toner images are transferred onto a sheet that has been conveyed from the sheet conveyance path 303.

A reference numeral 311 is a fixing unit for fixing toner images onto a sheet. The fixing unit 311 includes a pressure roller and a heating roller and fixes toner images to a sheet by melting/pressure bonding the toner when the sheet passes between the respective rollers. A sheet that has passed through the fixing unit 311 is conveyed to a reference numeral 315 through a sheet conveyance path 312. In a case where further melting/pressure bonding is required for fixing in accordance with the type of sheet, the sheet, after passing through the fixing unit 311, is conveyed to a second fixing unit 313 using an upper sheet conveyance path and, after undergoing additional melting/pressure bonding, is conveyed to the reference numeral 315 via a sheet conveyance path 314. In a case where an image forming mode is double-sided, a sheet is conveyed to a sheet reversing path 316, and the sheet, after being reversed at the reference numeral 316, is conveyed to a double-sided conveying path 317, and image transfer for the second side is performed at the secondary transfer position 309.

The inserter 108 comprises an inserter tray 321 and causes a sheet which has been fed via a sheet conveyance path 322 to merge with another conveyance path. By this, it becomes possible to insert a sheet at a desired position into a group of a series of sheets that are conveyed from the printing apparatus 107 and convey them to subsequent apparatuses.

A sheet which has traversed the inserter 108 is conveyed to the verification apparatus 109. In the verification apparatus 109, cameras 331 and 332 are arranged in opposing positions across a sheet conveyance path. The camera 331 is a camera for reading the upper surface of a sheet, and the camera 332 is a camera for reading the lower surface of the sheet. The verification apparatus 109, can determine whether an image of a printed material is normal by reading an image of the sheet using the cameras 331 and 332 at a timing at which a sheet that has been conveyed to a sheet conveyance path 333 has reached a predetermined position. A result of verification and the like that have been performed by the verification apparatus 109 are displayed on the display unit 241. Note that a display result may be displayed on a display of another apparatus. In this case, the verification apparatus 109 transmits data that indicates a verification result to an apparatus that displays verification results such as the PC 103. Data that is transmitted here may be data that indicates a verification result or may be screen data of a screen that displays verification results.

The large capacity stacker 110 has a stack tray 341 as a tray for stacking sheets. A sheet that has passed through the verification apparatus 109 enters the large capacity stacker 110 via a sheet conveyance path 344. The sheet passes through a sheet conveyance path 345 from the sheet conveyance path 344 and is stacked onto the stack tray 341 while being flipped. The stack tray 341 is configured by an elevating and lowering tray 342 and an eject tray 343. Furthermore, the large capacity stacker 110 has an escape tray 346 as a discharge tray. The escape tray 346 is a discharge tray used for discharging a sheet which has been determined as a defective sheet by the verification apparatus 109. In a case of outputting a sheet to the escape tray 346, the sheet is conveyed to the escape tray 346 via a sheet conveyance path 347 from the sheet conveyance path 344. Note that in a case of conveying a sheet to the finisher 111, which is subsequent to the large capacity stacker 110, the sheet is conveyed via a sheet conveyance path 348. A reference numeral 349 is an inversion unit for inverting the sheet. This inversion unit 349 is always used in a case of switching a sheet discharge destination in accordance with a determination result of the verification apparatus 109 which will be described later. This is to buy time for reading a sheet by the cameras 331 and 332, performing correctness determination, and switching the sheet conveyance paths 345 and 347. Note that in a case where verification is not performed, the inversion unit 349 is used only in a case where a sheet is stacked onto the stack tray 341 which stacks sheets while flipping them.

The finisher 111 performs finishing processing on a conveyed sheet in accordance with a function that has been designated by the user. Specifically, the finisher 111 has finishing functions such as stapling (1-point/2-point stapling), punching (2-hole/3-hole), and saddle stitch bookbinding. The finisher 111 comprises two sheet discharge trays 351 and 352, and outputting is performed toward a discharge tray 351 via a sheet conveyance path 353. However, finishing processing such as stapling cannot be performed in the sheet conveyance path 353. In a case of performing finishing processing such as stapling, a finishing function that has been designated by the user is executed in a processing unit 355 via a sheet conveyance path 354, and outputting is performed toward a discharge tray 352. The discharge trays 351 and 352 can be elevated and lowered, respectively, and it is possible to operate so as to lower the discharge tray 351 and stack onto the discharge tray 351 a sheet for which finishing processing has been performed in the processing unit 355. In a case where saddle stitch bookbinding has been designated, sheets, after stapling processing has been performed onto the center of the sheets in a saddle stitching processing unit 356, are folded in two and are outputted onto a saddle stitch bookbinding tray 358 via a sheet conveyance path 357. The saddle stitch bookbinding tray 358 has a conveyor-belt configuration and is configured to convey a saddle stitch bookbinding bundle that is stacked on the saddle stitch bookbinding tray 358 to the left side.

<Examples of Screens of Verification Apparatus>

Next, examples of display screens in the verification apparatus 109 according to the present embodiment will be described with reference to FIG. 4 to FIG. 12. The corresponding screens are displayed on the display unit 241 based on instructions of the CPU 238 of the verification apparatus 109. As described above, configuration may be taken such that the verification apparatus 109 transmits to an external apparatus data that indicates a verification result or screen information so as to be displayed thereon.

The verification apparatus 109 verifies a transmitted sheet image in accordance with preset verification items. Sheet image verification is performed by comparing a preset correct image and a read image of a transmitted sheet image. As for image comparison methods, there are methods such as a method of comparing pixel values for each image position, comparing positions of objects by edge detection, and extracting text data by OCR (Optical Character Recognition). As for verification items, there are a shift of a print position, a color tone of an image, a density of an image, a streak or thin spot, a missing print, and the like.

Figure 4:
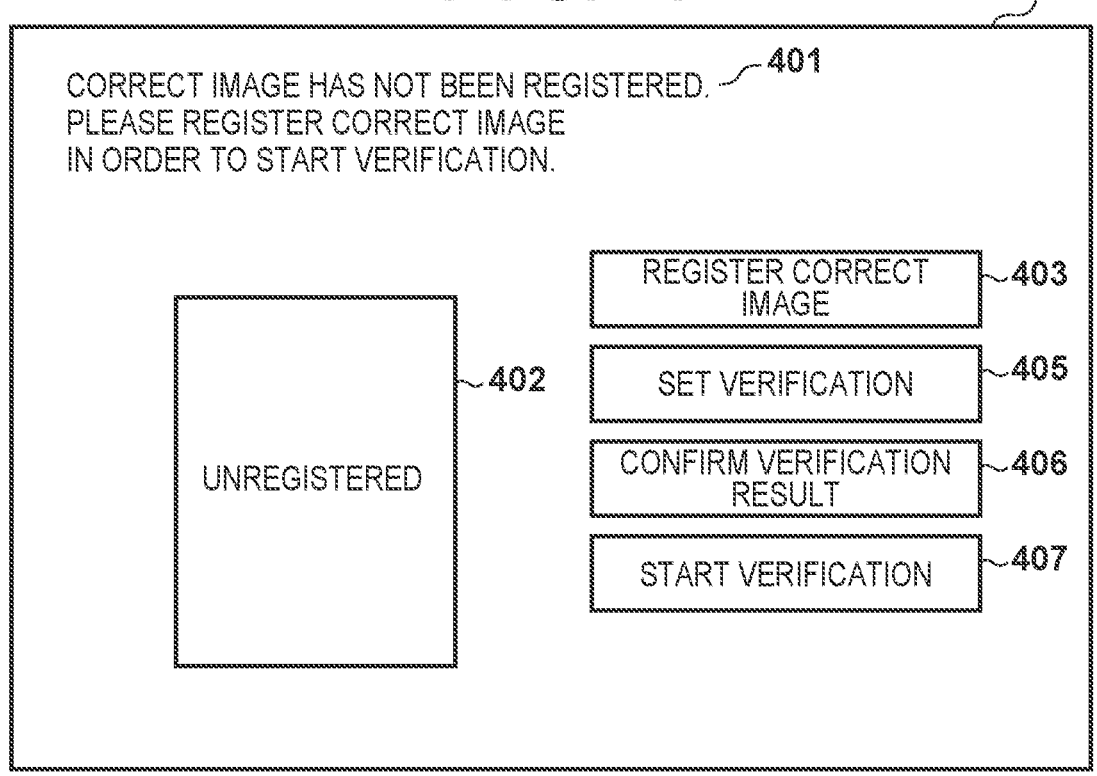
FIG. 4 is a view illustrating an example of a display screen before registering a correct image to the verification apparatus according to the embodiment.

FIG. 4 is an example of a screen that is displayed on the display unit 241 of the verification apparatus 109 at a time of activating the verification apparatus 109. A screen 400 is configured to include displays 401 to 407. In the reference numeral 401, it is displayed that a correct image has not been registered and that it is necessary to register a correct image in order to start verification. Meanwhile, in a case where a correct image has already been registered, it is displayed that verification can be started. The reference numeral 402 indicates a region in which a registered correct image is to be displayed. In FIG. 4, a correct image has not been registered; accordingly, it is displayed that a correct image is unregistered. The reference numeral 403 is a button for calling a correct image registration screen 500. A correct image is an image that is to be compared with an image that has been read in the verification apparatus 109, and a read image of a printed sheet that has already been determined by visual observation or the verification apparatus 109 to have been printed normally is used. The reference numeral 405 is a button for calling a verification setting screen 900. Verification items and verification accuracy are set in accordance with a verification objective of the user. Here, verification accuracy indicates at what level of difference from the correct image an image is determined as a defective image, and for example, a threshold that indicates a permissible range is set. The reference numeral 406 is a button for calling a verification result confirmation screen 1000. It is possible to confirm past verification content and verification results. The reference numeral 407 is a button for instructing a start of verification. When verification is started, the verification apparatus 109 starts verification of a transmitted sheet image. Note that in a case where verification cannot be started due to a correct image not being registered or the like, it is advantageous for the button 407 to be displayed in an unselectable state. In this case, the button 407 may be displayed by a display such as a grayout display or the like by which an operator can recognize an unselectable state and may be displayed to be selectable once these reasons have been resolved.

Figure 5:
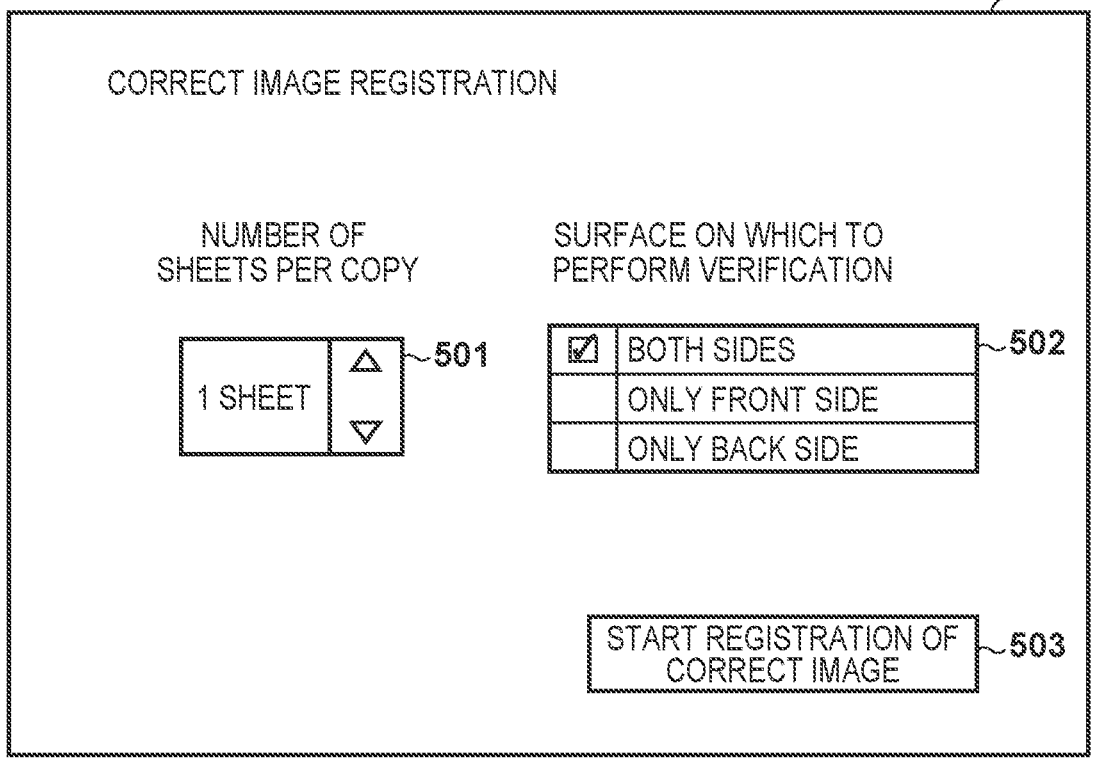
FIG. 5 is a view illustrating an example of a display screen for when performing registration of the correct image from the verification apparatus according to the embodiment.

FIG. 5 is an example of a screen that is displayed on the display unit 241 of the verification apparatus 109 when registering a correct image. The registration screen 500 is displayed when the button 403 of the screen 400 has been selected. The registration screen 500 is configured to include displays 501 to 503. The reference numeral 501 is a setting portion for setting the number of sheets per copy of a print job for which verification is to be performed. In a case where a print job includes two or more sheets per copy, it is possible to register a plurality of images as correct images in the verification apparatus 109. The reference numeral 502 is a setting portion for setting a surface for which verification is to be performed. It is possible to set verification that the verification apparatus 109 performs to both sides, a front side, or a back side of a sheet. Note that even in a case where printing is single-sided, it is possible to set so as to perform verification of both sides in order to verify that there is no foreign matter on a side on which printing is not performed. The reference numeral 503 is a button for instructing registration of a correct image. After the button 503 is pressed, the verification apparatus 109 reads an image of a conveyed printed sheet and registers it as a correct image.

FIG. 6 is an example of a screen that is displayed on the display unit 241 of the verification apparatus 109 during reading of a correct image. A screen 600 is displayed when the button 503 of the registration screen 500 has been pressed. The screen 600 is configured to include displays 601 and 602 in addition to the displays 501 and 502 as in the registration screen 500. The screen 600 is displayed until reading of the number of sheets 501 that has been set in the setting portion is completed. In the reference numeral 602, a message that a correct image is being read is displayed. The reference numeral 601 is a button for instructing cancellation of reading of a correct image. In a case where the button 601 has been pressed, the screen 400 is returned to without registration of a correct image being performed.

FIG. 7 is an example of a registration screen that is displayed on the display unit 241 of the verification apparatus 109 after reading of a correct image has been completed. A registration screen 700 is configured to include displays 701 to 706. An image of a printed sheet that has been read in the verification apparatus 109 is displayed on the display portion 701, and in a case where there are a plurality of images, an image that is displayed can be switched by the switching button 702, and in a case of performing verification of both front and back sides, front and back can be switched by the switching button 703. The reference numeral 704 is a button for instructing setting of a verification skip region. When the button 704 is pressed, a setting screen 800 is transitioned to. Here, it is possible to set a region for which verification is not performed for a case of printing in which print content of a specified region changes for each copy and the like such as variable data printing (VDP). For example, in a case of printing a different ID for each copy, in a case where an address or name is changed for each copy, or the like, it is necessary to set a corresponding position as a region for which verification is not performed. The reference numeral 705 is a button for performing, after confirming a read image of the display portion 701, a correct image registration instruction. In a case where the button 705 has been pressed, the verification apparatus 109 performs registration of a correct image that is displayed in the reference numeral 701 and returns to the screen 400. The reference numeral 706 is a button in a case of canceling reading. In a case where the button 706 has been pressed, the verification apparatus 109 returns to the screen 400 without performing registration of a correct image.

Figure 8:
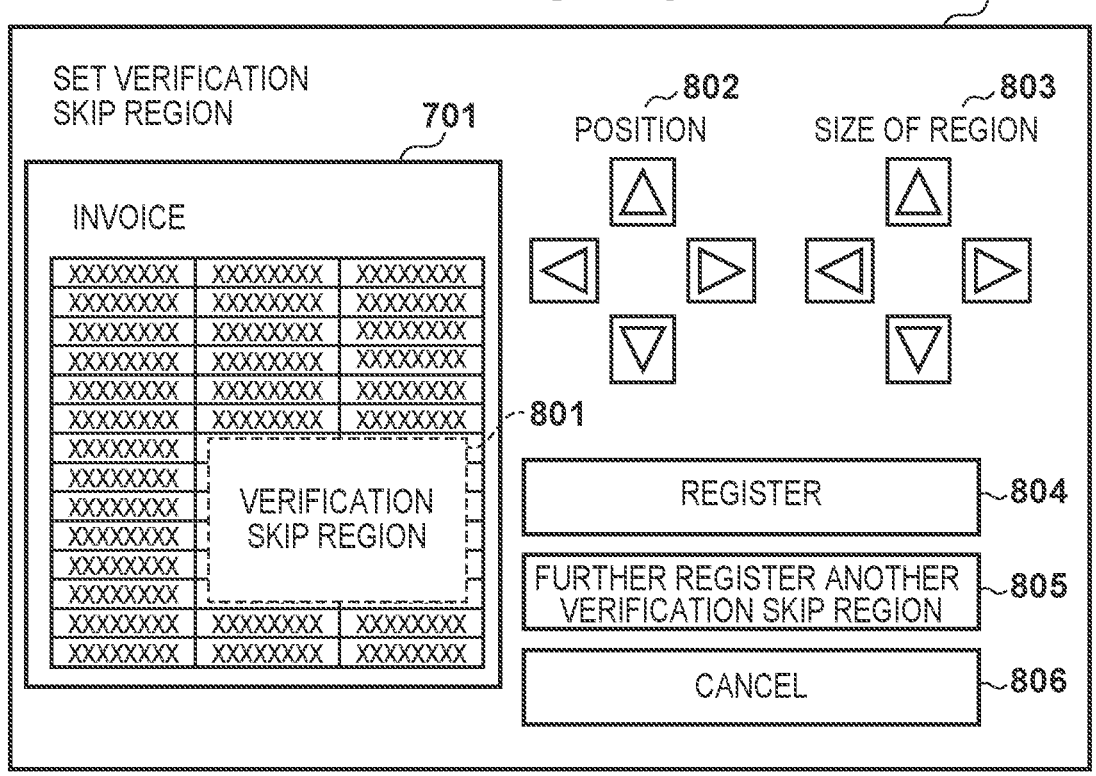
FIG. 8 is a view illustrating an example of a display screen for when setting a verification skip region in the verification apparatus according to the embodiment.

FIG. 8 is an example of a verification skip region setting screen that is displayed when the button 704 has been pressed. The setting screen 800 is configured to include displays 801 to 806 in addition to the display 701 as in the registration screen 700. The reference numeral 801 is a region for indicating a verification skip region on a correct image that is displayed in the reference numeral 701. In the example of FIG. 8, the reference numeral 801 is displayed as a rectangular region; however, configuration may be taken so as to display only the frame and display the correct image within the frame so as to be visible. It is possible to change a position of the region 801 in the position setting portion 802 and change a size of the region 801 in a size setting portion 803. The reference numeral 804 is a button for registering setting of a verification skip region. In a case where the button 804 has been pressed, the verification apparatus 109 registers a verification skip region in accordance with the region 801 that is currently being displayed and returns to the registration screen 700. The reference numeral 805 is a button for registering a verification skip region in accordance with the currently displayed region 801 and further registering another verification skip region. As described above, the verification apparatus 109 can set one or more regions as verification skip regions. The reference numeral 806 is a button for canceling setting of a verification skip region. In a case where the button 806 has been pressed, the verification apparatus 109 returns to the registration screen 700 without registering a verification skip region.

Figure 9:
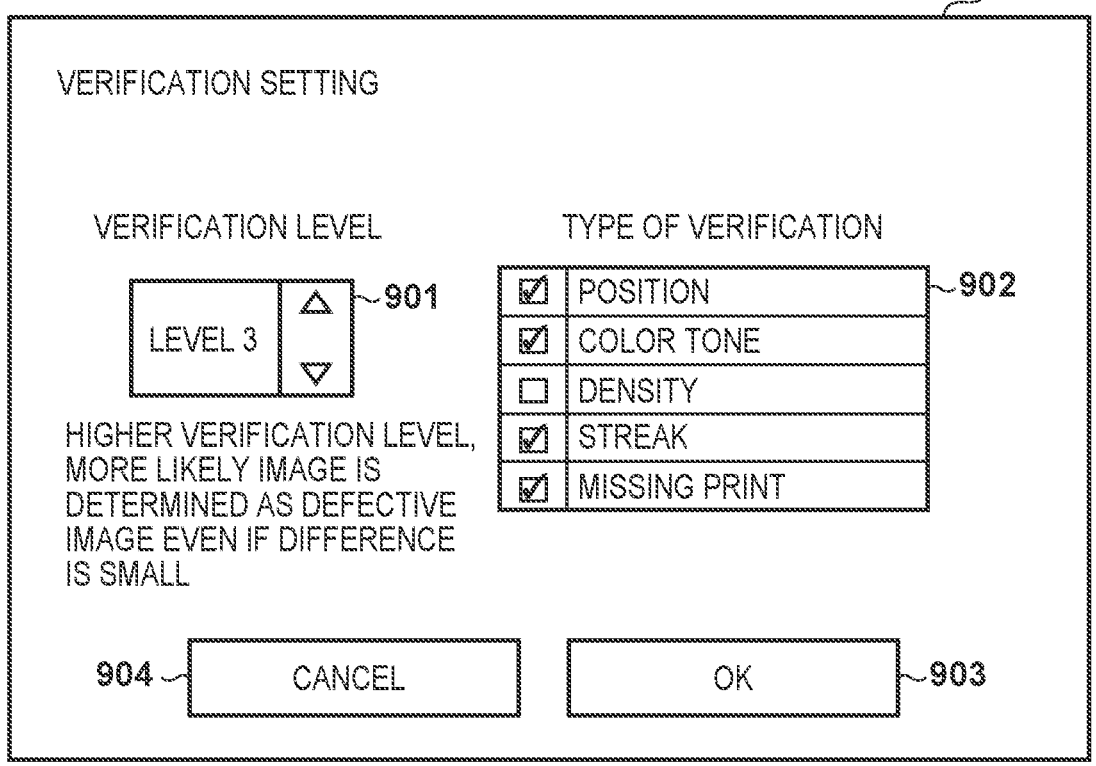
FIG. 9 is a view illustrating an example of a display screen for when performing verification setting from the verification apparatus according to the embodiment.

FIG. 9 is an example of a screen that is displayed on the display unit 241 of the verification apparatus 109 when performing verification setting. The setting screen 900 is displayed when the button 405 of the screen 400 has been pressed. The setting screen 900 is configured to include displays 901 to 904. The reference numeral 901 is a setting portion for setting a verification level. Here, it is possible to change verification accuracy. The higher the level of verification accuracy, the more likely it is for the verification apparatus 109 to determine a read image as a defective image even if a difference of a correct image and the read image is small. For example, corresponding thresholds are dynamically changed in accordance with a set verification accuracy. The reference numeral 902 is a setting portion for setting the type of verification. It is possible to set one or more verification items in accordance with a verification objective of the user. In the example of FIG. 9, it is illustrated that position, color tone, streak, and missing print are to be verified but density is not to be verified. In a case where the OK button 903 has been pressed, set content is reflected and the screen 400 is returned to. In a case where the cancel button 904 has been pressed, the screen 400 is returned to without set content being reflected. In this case, a default setting for when the setting screen 900 was transitioned to is returned to.

FIG. 10 is an example of a screen that is displayed on the display unit 241 of the verification apparatus 109 when displaying a verification result. The confirmation screen 1000 is displayed when the button 406 of the screen 400 has been pressed. The confirmation screen 1000 is configured to include displays 1001 to 1003. A date and time on which verification was performed, properties of the entire job, and a verification result are displayed in the display portion 1001. In the example of FIG. 10, it is illustrated as a verification result that the number of normal sheets was 986 sheets with respect to the number of verified sheets of 1000 and that the number of sheets that have been determined as defective images was 14 sheets. The reference numeral 1002 is a screen for selecting a job for which a verification result is displayed. In the example of FIG. 10, a verification result of the first job among 9 jobs for which a history is stored is displayed. By operating a left or right button in the reference numeral 1002, a job that is displayed can be switched. The reference numeral 1003 is a button that instructs that verification result confirmation has been completed. In a case where the button 1003 has been pressed, the screen 400 is returned to.

FIG. 11 is an example of a screen that is displayed on the display unit 241 of the verification apparatus 109 after a start of verification. A screen 1100 is displayed when the button 407 of the screen 400 has been pressed. The screen 1100 is configured to include displays 1101 to 1104. In the display portion 1101, a read image of a printed sheet that the verification apparatus 109 has last read is displayed. In the display portion 1102, a determination result of comparison of a read image in the reference numeral 1101 and a correct image is displayed. In the example of FIG. 11, the image has been determined as a normal image; accordingly, it is displayed OK. The reference numeral 1103 is a button for instructing an end of verification. In a case where the button 1103 has been pressed, the verification apparatus 109 ends verification processing and returns to the screen 400. The reference numeral 1104 is a button for instructing to display a screen for confirming a verification result of the entire job. In a case where the button 1104 has been pressed, the confirmation screen 1000 of FIG. 10 is displayed.

Figure 12:
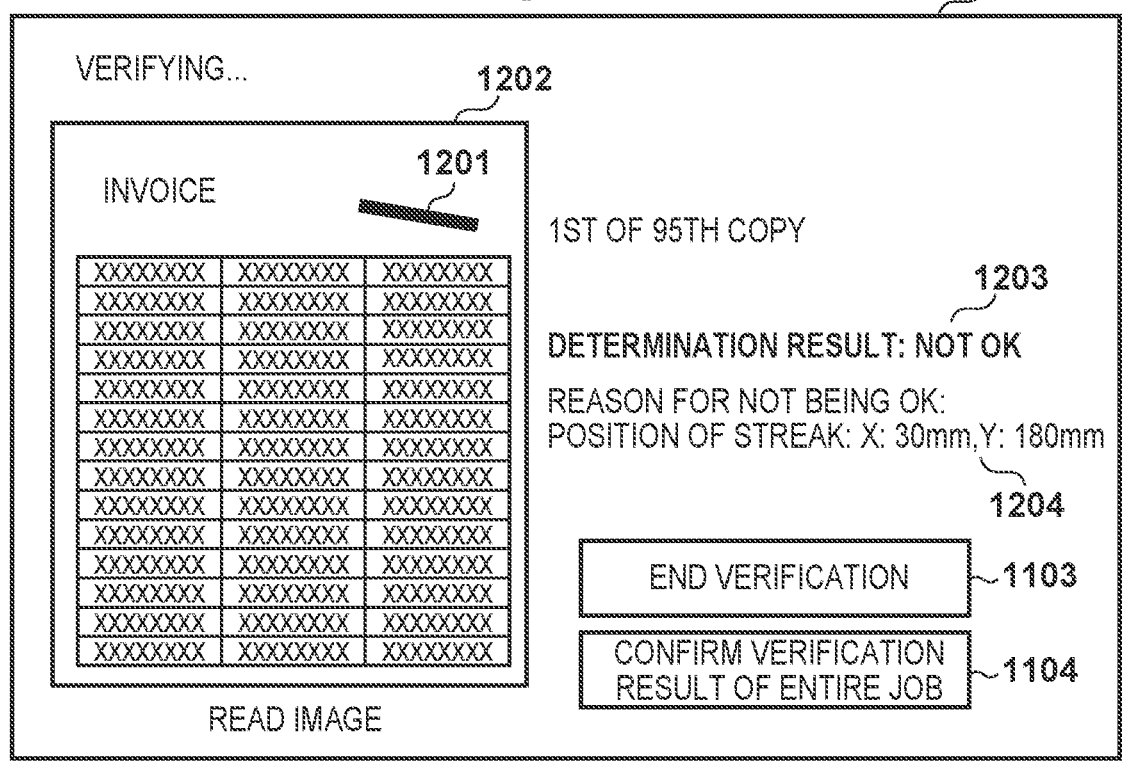
FIG. 12 is a view illustrating an example of a display screen for when the verification apparatus has determined that verification is not OK according to the embodiment.

FIG. 12 is an example of a screen in a case where the last read image has been determined as a defective image. A screen 1200 is configured to include displays 1201 to 1204 in addition to the displays 1103 and 1104 as in the screen 1100. In the display portion 1202, a read image of a printed sheet that the verification apparatus 109 has last read is displayed. In this read image, a streak 1201 is detected. Due to detection of this streak 1201, the image is determined as a defective image as a result of comparison of the read image and a correct image, and not OK is displayed in the reference numeral 1203 and reason as to why and a position of what has been determined not OK are displayed in the reference numeral 1204. Here, it is possible to recognize that the image has been determined as a defective image due to detection of the streak 1201, and it is also possible to recognize a coordinate of a position of the defect (here, a position of the streak 1201) on the read image.

<Registration Processing>

Figure 13:
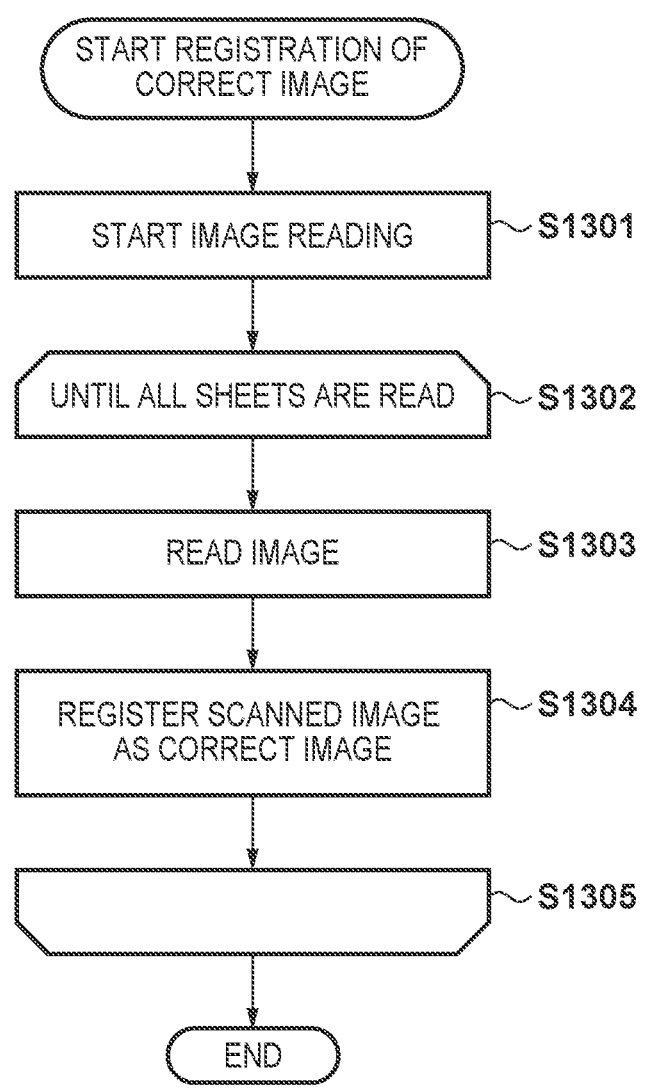
FIG. 13 is a flowchart illustrating operation of a verification apparatus at a time of registering the correct image according to the embodiment.

Next, a processing procedure of the verification apparatus 109 for when registering a correct image for verification according to the present embodiment will be described with reference to FIG. 13. The processing, which will be described below, is realized by, for example, the CPU 238 of the verification apparatus 109 executing a control program that is stored in the memory 239.

In step S1301, the CPU 238, when it receives an instruction to start reading an image from the user via the correct image registration button 403 and the button 503 on the display unit 241, starts reading an image of a sheet by driving the cameras 331 and 332. Next, the processing advances to step S1302, and the processing from steps S1303 to S1305, which will be described later, is repeatedly performed until images of all the sheets are read. In a case where there is a sheet for which an image is to be read, the processing advances to step S1303. In step S1303, the CPU 238 reads an image of a sheet by using the camera 331 and the camera 332 and, in step S1304, stores the read image in the memory 239 of the verification apparatus 109. The image that was stored here is displayed on the display portion 701 of the registration screen 700. Then, the processing advances to step S1305, and the CPU 238 repeats steps S1302 to S1305 until it completes reading images of all the sheets. When reading of images of all the sheets is completed, this flow is ended.

In the above-described correct image registration processing, an example in which a start instruction is accepted via a screen that is displayed on the display unit 241 of the verification apparatus 109 has been described; however, there is no intent to limit the present invention. For example, an instruction to start reading an image may be automatically conducted in combination with an instruction to start printing in the printing apparatus 107, the PC 103, or the external controller 102. Also, for example, the verification apparatus 109 may take a form so as to read a plurality of images for the same page and register a result of composition thereof as a correct image.

<Verification Processing>

Figure 14:
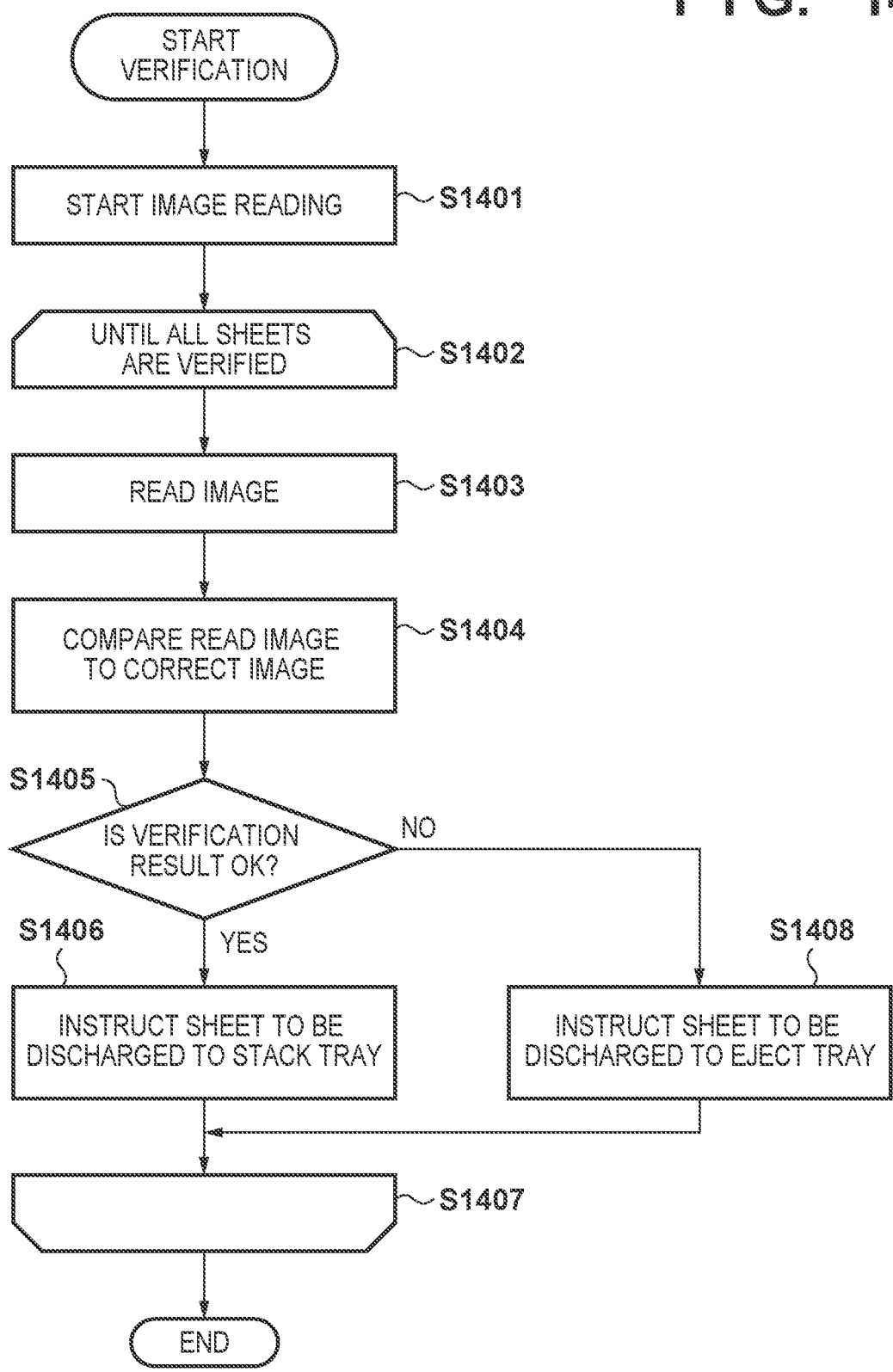
FIG. 14 is a flowchart illustrating operation of a verification apparatus at a time of executing verification according to the embodiment.

Next, a processing procedure of the verification apparatus 109 at time of verification according to the present embodiment will be described with reference to FIG. 14. The processing, which will be described below, is realized by, for example, the CPU 238 of the verification apparatus 109 executing a control program that is stored in the memory 239.

In step S1401, the CPU 238 accepts an instruction to start verification from the user via the verification start button 407 of the screen 400 that is displayed on the display unit 241. Next, the processing advances to step S1402, and the CPU 238, in a case where there is a sheet to be verified, advances to step S1403. In step S1403, the CPU 238 reads an image of a conveyed sheet using the cameras 331 and 332. Next in step S1404, the CPU 238 compares a correct image that is stored in the memory 239 and a read image (scanned image) that was read in step S1403. This correct image is assumed to be a sheet that has been printed by the printing apparatus 107 in advance before a start of this flow, scanned by the cameras 331 and 332, and stored in the memory 239. In this comparison operation, first, image positions of the correct image and the scanned image to be verified, are aligned using a characteristic point of the image as a reference point for positional alignment. Next, in the scanned image to be verified, the four corners of the sheet and the reference points for alignment of the scanned image are analyzed, and it is detected whether or not there is misalignment of the image with respect to the sheet. Next, density values of the correct image and the scanned image to be verified, are compared for each pixel. If, as a result of the above, a defect is not detected, a verification result is deemed OK.

Next in step S1405, the CPU 238 determines whether or not a verification result is OK. If it is OK, the processing advances to step S1406, and the CPU 238 instructs that the verification result is OK (e.g., sheet discharge to the stack tray 341 of the large capacity stacker 110) via the communication cable 254. Then, the processing advances to step S1407 and steps S1402 to S1407 are repeated until verification of all the sheets is completed. When verification of all the sheets is completed, this flow is ended. Meanwhile, if the verification result is not ok in step S1405, the processing advances to step S1408, and the CPU 238 instructs that the verification result is not OK (i.e., sheet discharge to the eject tray 343 of the large capacity stacker 110) via the communication cable 254. Then, the processing advances to step S1407.

In the above-described verification processing, an example in which a start instruction is accepted via a screen that is displayed on the display unit 241 of the verification apparatus 109 has been described; however, there is no intent to limit the present invention. For example, an instruction to start verification may be automatically conducted in combination with an instruction to start printing in the printing apparatus 107, the PC 103, or the external controller 102. Also, an example in which in a case where the verification result is OK, a sheet is discharged to the stack tray 341, and in a case where the verification result is not OK, a sheet is discharged to the eject tray 343 has been described here; however, there is no intent to limit the present invention, and a discharge destination may be switched in accordance with a user instruction or print settings.

<Example of Screen of External Controller>

Figure 15:
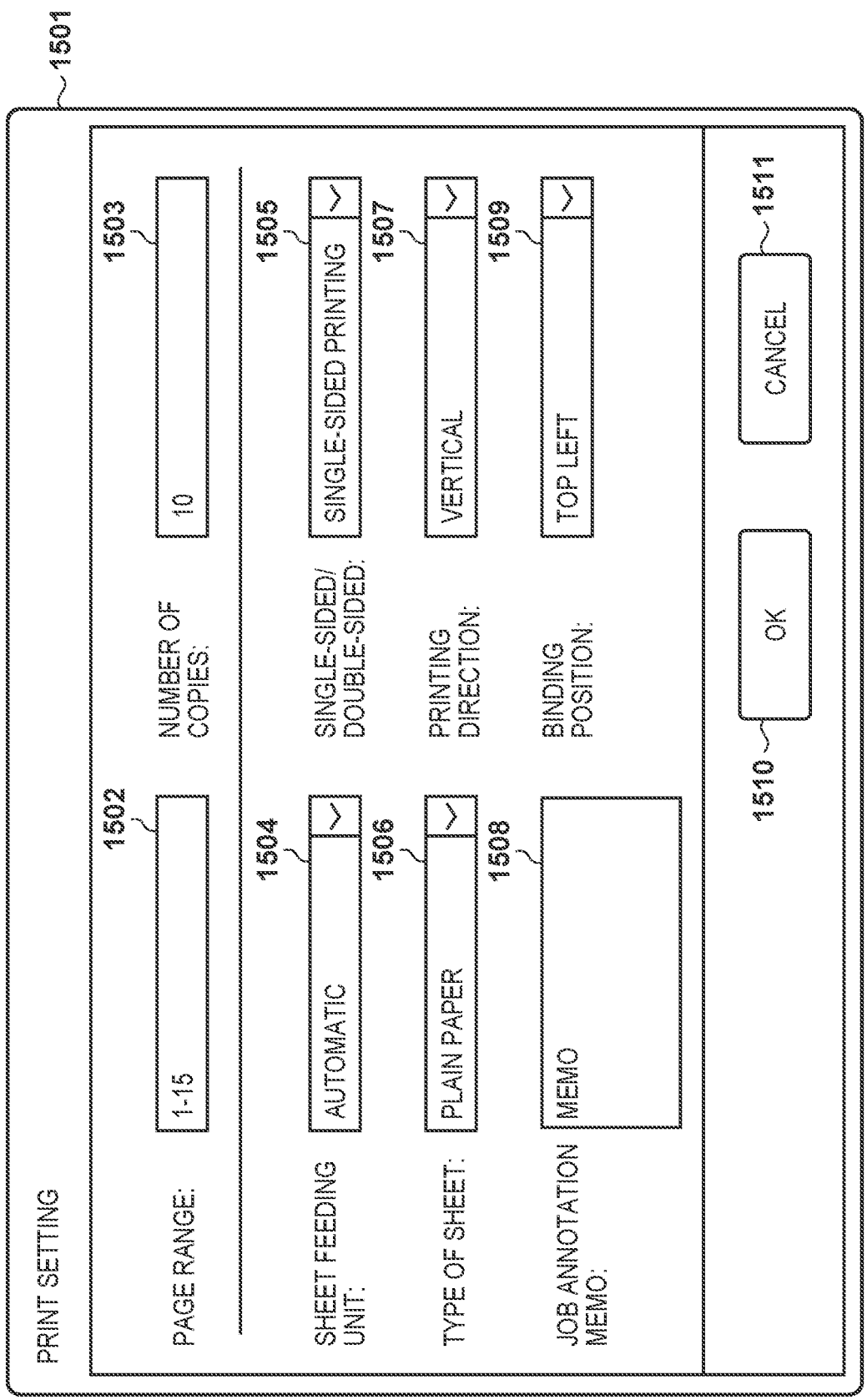
FIG. 15 is a view illustrating an example of a job setting screen at a time of registering the correct image according to the embodiment.

Next, an example of a setting screen for setting a printing condition of a job at a time of correct image registration that is displayed on the display 212 of the external controller 102 according to the present embodiment will be described with reference to FIG. 15. FIG. 4 to FIG. 12 are examples of screens for when performing verification setting in relation to the verification apparatus 109; however, instructions to supply a printed sheet of a correct image and a printed sheet to be verified to the verification apparatus 109 can be performed from the external controller 102. Note that this print setting may be understood as an example of a screen of a printer driver that is installed in the PC 103 and corresponds to the image forming apparatus 101. A user that wants to perform printing can perform a print instruction by opening this screen from various applications and the like.

A print setting screen 1501 is configured to include displays 1502 to 1511. The text box 1502 enables designation of a page range, and an instruction of print settings to be applied to the page range that has been designated in the text box 1502 can be performed on the print setting screen 1501. Here, as examples of setting items to be set as a printing condition, it is assumed that it is possible to designate the number of copies, a sheet feeding unit, single-sided/double-sided, the type of sheet, a printing direction, a job annotation memo, and a binding position. The number of copies text box 1503 is a text box for designating the number of copies of a page range that has been designated in the reference numeral 1502. The sheet feeding unit pull-down menu 1504 is a menu for selecting from which sheet feeding unit among a plurality of sheet feeding units 230 in the printing apparatus 107 to feed a sheet. The single-sided/double-sided pull-down menu 1505 is a menu for selecting single-sided printing or double-sided printing. The type of sheet pull-down menu 1506 is a menu for selecting the type of sheet such as plain paper and thick paper. The printing direction pull-down menu 1507 is a menu for selecting vertical (portrait) or horizontal (landscape). The job annotation memo text box 1508 is a text box for inputting a memo that relates to a job. The binding position pull-down menu 1509 is a menu for designating a binding position of a printed material, and it is possible to select top-left, top-right, bottom-left, bottom-right, or the like.

The reference numeral 1510 is an OK button and is pressed when print setting is completed. The reference numeral 1511 is a cancel button and, when pressed, cancels the print setting and returns to a screen before the print setting screen 1501 was transitioned to. After print setting has been completed and a start of registration of a correct image to the verification apparatus 109 has been instructed by the correct image registration button 403 of FIG. 4, printing of a job is instructed to the external controller 102. Then, print processing by the printing apparatus 107 and reading and registration of a correct image by the verification apparatus 109 are performed in accordance with the flow that has been described in FIG. 13. Note that a job print instruction is performed by, for example, a press of a print button 1808 of FIG. 18 which will be described later.

<Print Output>

Figure 16:
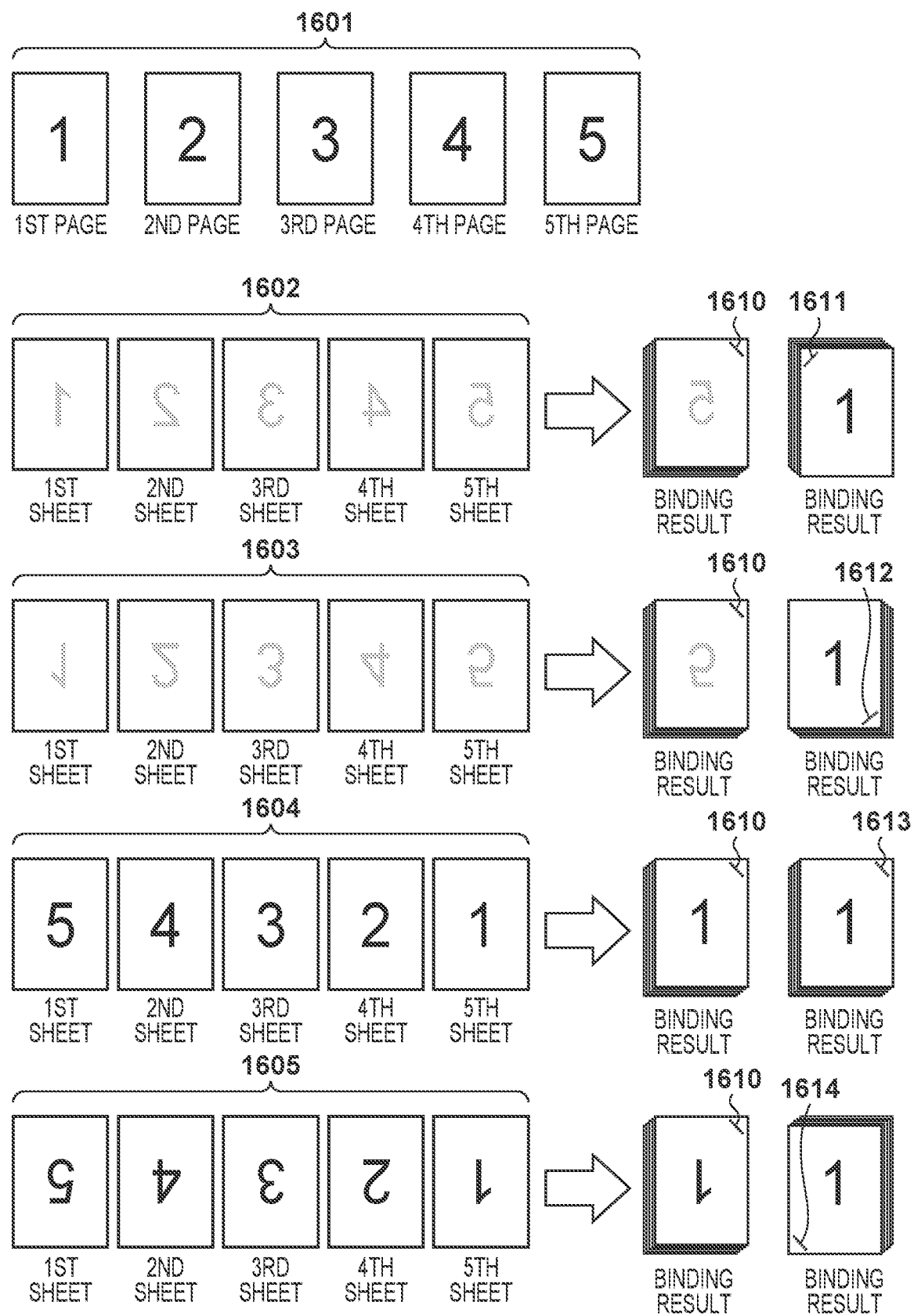
FIG. 16 is a view illustrating examples of outputting a job to be verified according to the embodiment.

Next, an example of outputting of a print job according to the present embodiment will be described with reference to FIG. 16. FIG. 16 illustrates a correspondence relation of print control, binding processing, and binding results in a case of binding a sheet bundle in the finisher 111. A reference numeral 1610 indicates a position on which stapleless binding has been performed, and a sheet bundle on which stapleless stapling has been performed is bound by a portion of the sheets being squashed and pressure bonded with each other.

A reference numeral 1601 represents images that are sent to the image forming apparatus 101 via the video I/F 215 from the external controller 102. In contrast to this, reference numerals 1602 to 1605 represent images that are printed in the image forming apparatus 101; "1", "2", "3", "4", and "5" indicate images that are printed; and directions of the numbers represent directions of the images that are printed onto the sheets. The ones on which text is written darkly represent a face up discharge, and the ones on which text is written lightly represent a face down discharge. Here, discharging an outputted sheet in a state in which a front surface of a print surface can be seen when seen from an upper side of the apparatus is referred to as face up. Meanwhile, discharging an outputted sheet in a state in which a back surface of a print surface can be seen when seen from an upper side of the apparatus (a state in which a front surface is facing down) is referred to as face down. In the present embodiment, normal order printing in which printing is performed in order from the first page of a plurality of pages is normally performed. In this case, sheets are discharged facing down in order to match an output order of printed materials. By a sheet of the first page being discharged onto a tray and then the subsequent pages being discharged facing down, the sheets are stacked in a normal order.

In a case of binding a top-left corner of a printed material, normal order printing is performed without rotating the direction of the images as illustrated in 1602. When the fifth sheet is discharged, binding processing is performed at the position 1610. In this case, as a binding result, a top-left corner (position 1611) of a printed material is bound. Also, in a case of binding a bottom-right corner of a printed material, normal order printing is performed by rotating the direction of the images 180 degrees (top-bottom inversion) as illustrated in 1603. When the fifth sheet is discharged, binding processing is performed at the position 1610. In this case, as a binding result, a bottom-right corner (position 1612) of a printed material is bound.

Next, in a case of binding a top-right corner of a printed material, reverse order printing is performed without rotating the direction of images. First, image data of the fifth page is printed onto the first sheet. In this case, a face up discharge is performed such that the printed surfaces face up. When printing advances, image data of the first page is printed onto the fifth sheet, and discharge is performed onto the tray, binding processing is performed at the position 1610. In this case, a top-right corner (position 1613) of a printed material is bound. Also, in a case of binding a bottom-left corner of a printed material, reverse order printing is performed by rotating the direction of images 180 degrees. When the fifth sheet is discharged, binding processing is performed at the position 1610. In this case, a bottom-left corner (position 1614) of a printed material is bound.

As described above, even if a binding position for when executing binding processing is the same, it is possible to change the binding position with respect to the printed materials by controlling the rotation of images that are printed and an order in which the images that are printed are outputted. There are other print settings that require control of the direction and order (order in which pages are printed) of images such as layout control by saddle stitch binding printing, and if these print settings are changed from a setting at a time of registering a correct image and are executed as a job to be verified, it becomes impossible to perform comparison with the correct image. As other examples in which comparison with a correct image cannot be performed, a change in the appearance of color of an image to be printed, enlargement/reduction of an image due to a change in the size of sheet, and the like are given. As described above, in a case where a change by which comparison with a correct image ceases to be performable has been made, it is necessary to redo the process from registration of a correct image. Accordingly, in order to prevent such a redo, it is advantageous to prohibit (or restrict) a setting change by which comparison with a correct image cannot be performed in a case of changing print settings from a time of registering a correct image and performing verification.

<Processing Procedure of External Controller>

Figure 17:
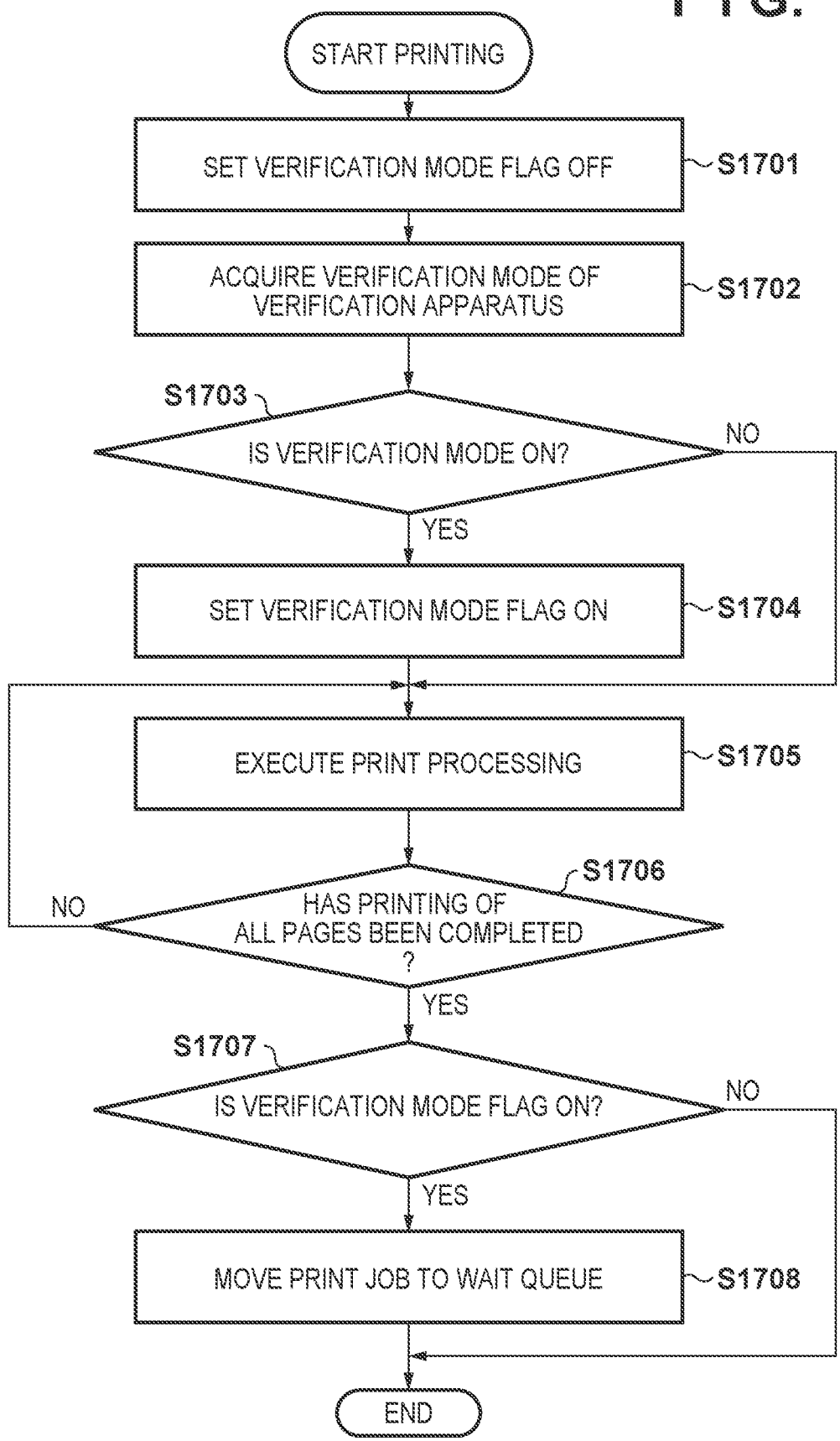
FIG. 17 is a flowchart illustrating operation of an external controller from a start to an end of printing according to the embodiment.

A method of controlling so as to enable reliable comparison with a registered correct image will be described below. First, a processing procedure for processing that relates to printing by the external controller 102 according to the present embodiment will be described with reference to FIG. 17. Specifically, a processing procedure of the external controller 102 from when a start of printing is instructed after necessary print setting has been performed on the print setting screen 1501 to when printing is completed is indicated. The processing, which will be described below, is realized by, for example, the CPU 208 of the external controller 102 executing a control program that is stored in the memory 209 or the HDD 210.

The external controller 102 stores a verification mode flag on the memory 209 that has been read out by the HDD 210 and a program in association with a print job that is transmitted to the image forming apparatus 101. A verification mode flag is a flag that indicates whether or not the verification apparatus 109 is in a mode in which an image on a sheet is to be read using the cameras 331 and 332 (hereinafter, referred to as a verification mode is on) and is a flag to be set when a job has been transmitted from the external controller 102 to a printing apparatus 107. Note that as described above, a verification mode of the verification apparatus 109 is turned on when the correct image registration button 403 or the verification start button 407 is pressed.

When printing is instructed, first in step S1701, the CPU 208 of the external controller 102 sets a corresponding flag to off in order to initialize the verification mode flag. Next in step S1702, the CPU 208, immediately before transmitting a print job to the image forming apparatus 101, makes an inquiry to the verification apparatus 109 via the LAN I/F 213 whether or not the verification mode is on. In step S1703, the CPU 208 determines whether or not the verification mode that was acquired in step S1702 is on. In a case where it is on, the processing advances to step S1704, and the CPU 208 sets the verification mode flag of the memory 209 to on, stores it in association with the print job, and advances the processing to step S1705. Meanwhile, in a case where the verification mode is off, the CPU 208 does not change the value of the verification mode flag from an initial value and advances the processing to step S1705.

Next in step S1705, the CPU 208 executes print processing based on a setting of the print setting screen 1501 and transmits to the printing apparatus 107 the processed print job (print data) for each page. Next in step S1706, the CPU 208 repeatedly executes step S1705 until printing of all the pages in the image forming apparatus 101 is completed. When printing of all the pages is completed, the processing advances to step S1707, and the CPU 208 references the value of the verification mode flag that is stored in the memory 209. If the verification mode is on, the processing will advance to step S1708, and in a case where it is not on, this flow is ended. In step S1708, the CPU 208 moves the job to a wait tab of FIG. 18, which will be described later, and ends the flowchart. A job that is moved to the wait tab (also referred to as a wait queue) is managed by temporarily being stored in the HDD 210 together with the verification mode flag. The processing that displays the jobs that have been stored in the wait queue is called by the CPU 208 based on a program that is stored in the HDD 210 and then is executed. Note that this flowchart can be applied to printing for when registering a correct image and for when performing printing as a verification job.

<Job Management Screens>

Figure 18:
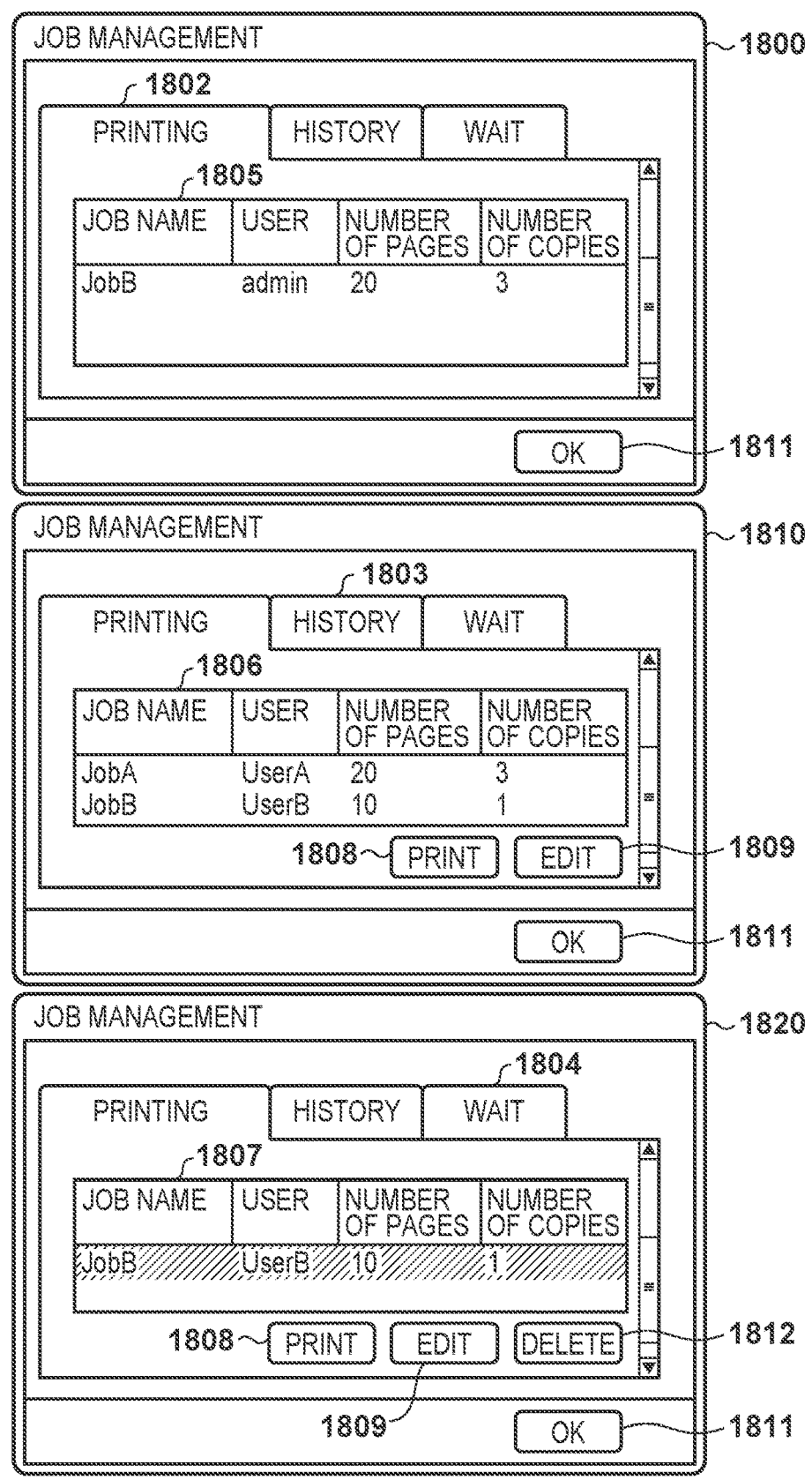
FIG. 18 is a view illustrating an example of job management screens according to the embodiment.

Next, job management screens that are displayed on the display 212 of the external controller 102 according to the present embodiment will be described with reference to FIG. 18.

Reference numerals 1800, 1810, and 1820 indicate job management screens. The job management screens can display a variety of information that relate to a print job. There are many items with regard to information that relate to a job; accordingly, it is difficult to browse all the information on the same screen. Accordingly, a display is often performed by providing a plurality of tabs such as in the job management screens 1800, 1810, and 1820 illustrated in FIG. 18 or by transitioning to another setting screen. In the job management screens 1800, 1810, and 1820, there are a tab 1802 that displays a job that is being printed, a tab 1803 that displays a history of jobs that were printed in the past, and a tab 1804 that displays jobs that are being made to wait for the next printing. A screen that is displayed when each of the tabs are pressed are the reference numerals 1800, 1810, and 1820, respectively. Note that the number of items, tabs, and the like that are displayed are not limited to this and may be increased/decreased in accordance with the functions of the external controller 102 and/or the image forming apparatus 101.

The job management screens 1800, 1810, and 1820 indicate a situation from a start to an end of printing of Job B for correct image registration. The external controller 102, when printing is instructed for correct image registration, executes print processing in accordance with the flow of FIG. 17. While print processing is being executed, Job B is displayed in the printing tab 1802 together with an overview of the print setting (user, number of pages, number of copies) thereof as illustrated in the job management screen 1800. When printing is completed, Job B is displayed in the history tab 1803 in a list together with jobs that were printed in the past as illustrated in the job management screen 1810. Also, at the same time, Job B is moved to the wait tab 1804 as illustrated in the reference numeral 1820. A timing at which to move to the wait tab is the previously-described step S1708 of FIG. 17 and is executed when the verification mode flag is on.

An OK button 1811 is a button for closing the job management screens 1800, 1810, and 1820. The print button 1808 that is provided in the history tab 1803 and the wait tab 1804 is a button that performs printing of a selected job. When a job is selected, black text changes to white-filled text as illustrated in the reference numeral 1820. When the print button 1808 is clicked in this state, the selected job is printed with the print setting for when printing was previously performed. Note that in a case where it is desired to change the print setting, it is possible to change the setting values by pressing an edit button 1809 and opening the print setting screen 1501. A delete button 1812 is a button that enables deletion of a job that has been selected from among the jobs that are in the wait tab. Normally, the user that has performed correct image registration selects a corresponding job from the wait tab and conducts verification after changing the number of copies. For example, in a case of registering a correct image, the number of copies is set to "1"; however, in a case of actually performing printing and verification, these are performed after changing to the necessary number of copies.

<Print Setting After Registering Correct Image>

Figure 19:
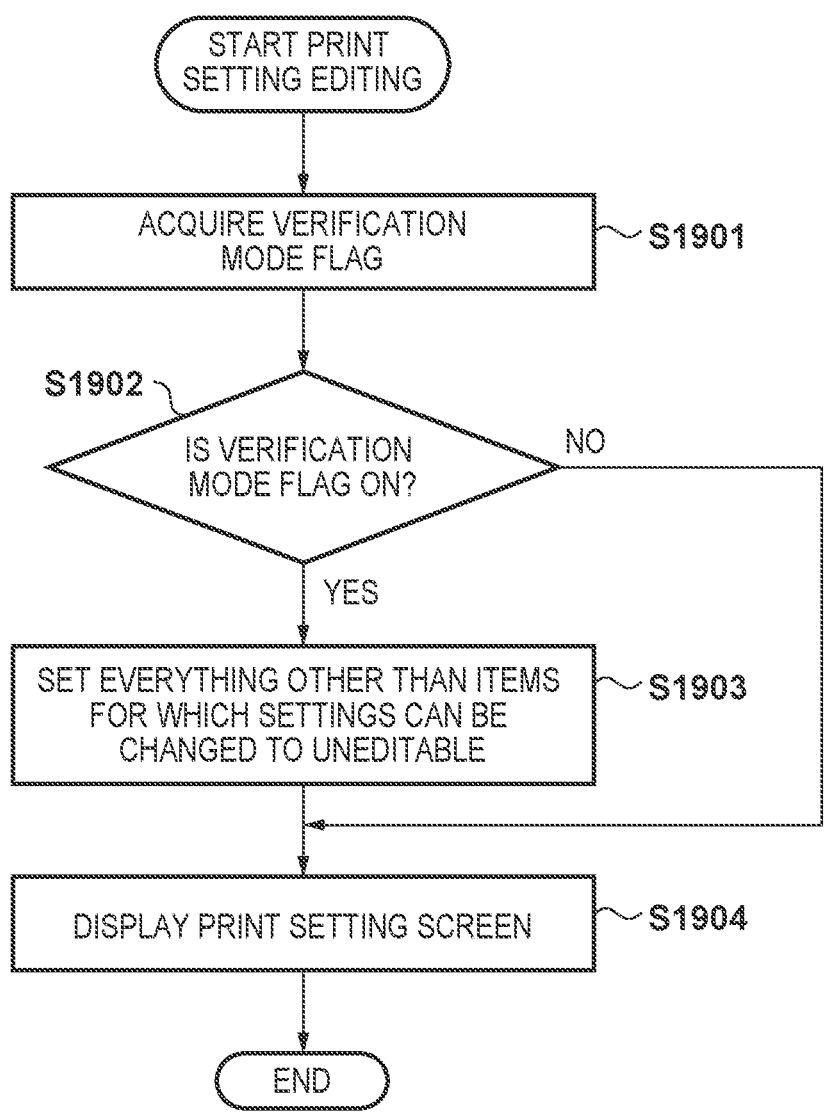
FIG. 19 is a flowchart illustrating operation of the external controller for when displaying a print setting screen according to the embodiment.

Next, a processing procedure for when displaying the print setting screen 1501 when a job has been selected and the edit button 1809 has been pressed in the wait tab 1804 of the job management screen 1820 in the external controller 102 according to the present embodiment will be described with reference to FIG. 19. In other words, processing for displaying the print setting screen for when an operator, after a correct image has been registered, changes print settings and instructs execution of verification processing will be described here. The processing, which will be described below, is realized by, for example, the CPU 208 of the external controller 102 executing a control program that is stored in the memory 209 or the HDD 210.

In step S1901, the CPU 208 acquires from the HDD 210 a verification mode flag that is stored in association with a job in the wait queue and confirms in step S1902 whether or not that flag is on. In a case where the verification mode flag is on, the processing advances to step S1903, and in a case where it is not on, the processing advances to step S1904.

In step S1903, the CPU 208 restricts editing for everything other than items for which settings can be changed and advances the processing to step S1904. Here, items for which settings can be changed are setting items that can be compared with a correct image even if settings have been changed. As described using FIG. 16, for example, if a binding position setting is changed, the direction and order of images of sheets that are printed will change; accordingly, comparison with a correct image that has been registered in advance can no longer be performed. In other words, the CPU 208 restricts a setting change of setting items for which verification processing cannot be properly executed in a case where print settings are changed due to the direction or order of images of sheets that are printed changing. Specifically, the CPU 208, for example in the print setting screen 1501, controls so as to enable editing for only setting items for which settings can be changed and restricts editing for items for which settings are restricted. Here, restricting editing may be not displaying the corresponding setting items or may be controlling so as to display in a grayout but be inoperable. Alternatively, configuration may be taken so as to operably display in a grayout or display a warning that if operated, it is necessary to redo correct image registration. In step S1904, the CPU 208 displays on the display 212 a print setting screen whose UI has been controlled as described above and ends this flow.

<Print Setting Screen with Restriction>

Next, an example of a print setting screen for which editing has been restricted in the above step S1903 for everything other than items for which settings can be changed will be described with reference to FIG. 20. Among the setting items of a print setting screen 2001, setting items for a page range 2002, single-sided/double-sided 2005, a type of sheet 2006, a printing direction 2007, and a binding position 2009 are displayed in a grayout and are controlled such that the settings cannot be changed. If the settings are changed, the direction and order of images of sheets that are printed, the appearance of color of the images, and the like will be changed, and comparison with a correct image that has been registered in advance can no longer be performed.

Meanwhile, with regards to a number of copies 2003, a sheet feeding unit 2004, and a job annotation memo 2008, which are items for which there is no problem in comparison with a correct image even if settings are changed, settings can be changed and display is performed as in the print setting screen 1501. Normally, it is often the case that verification is performed after changing only the number of copies 2003 from the setting at the time of registering a correct image. Note that items that are grayed out such that the settings are not changed and items that are not grayed out in order to permit a setting change are an example, and there is no intent to limit the present invention. Also, the items for which a setting change is not permitted have been grayed out and made inoperable; however, configuration may be taken so as to permit forcibly changing the setting items on which such a restriction has been placed. In this case, the setting items on which a restriction has been placed are displayed in a grayout and are displayed to be operable. Furthermore, there is a possibility that comparison with a correct image may no longer be possible; accordingly, it is advantageous that anything to that effect is notified to the user and that the verification mode is also changed to off. Details will be described later using FIG. 21 and FIG. 22.

<Forced Change of Uneditables>

Figure 21:
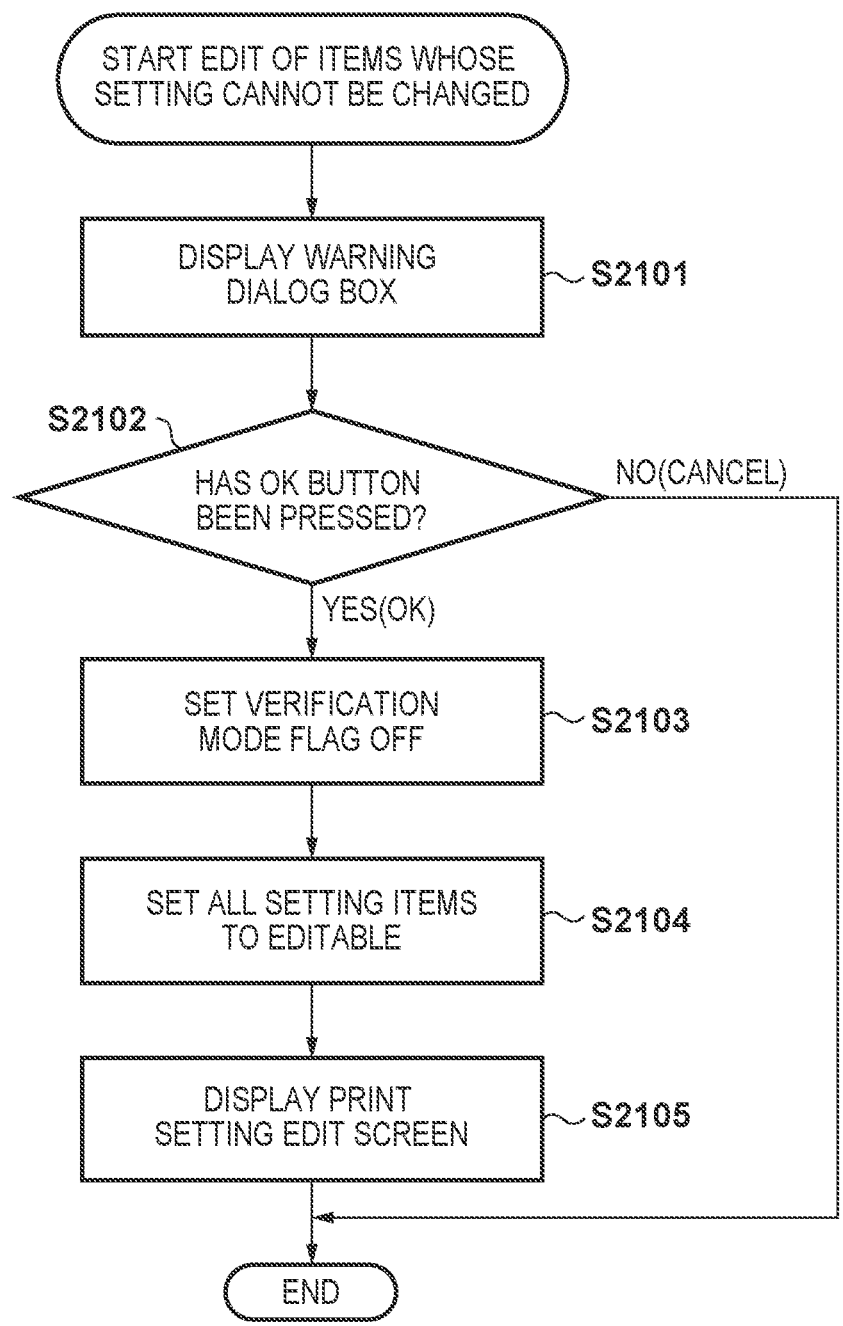
FIG. 21 is a flowchart illustrating operation of the external controller for when forcibly changing a grayout item according to the embodiment.

Next, a processing procedure of the external controller 102 for when selecting grayed-out setting items and instructing a forced change in the print setting screen 2001 according to the present embodiment will be described with reference to FIG. 21. The processing, which will be described below, is realized by, for example, the CPU 208 of the external controller 102 executing a control program that is stored in the memory 209 or the HDD 210.

Figure 22:
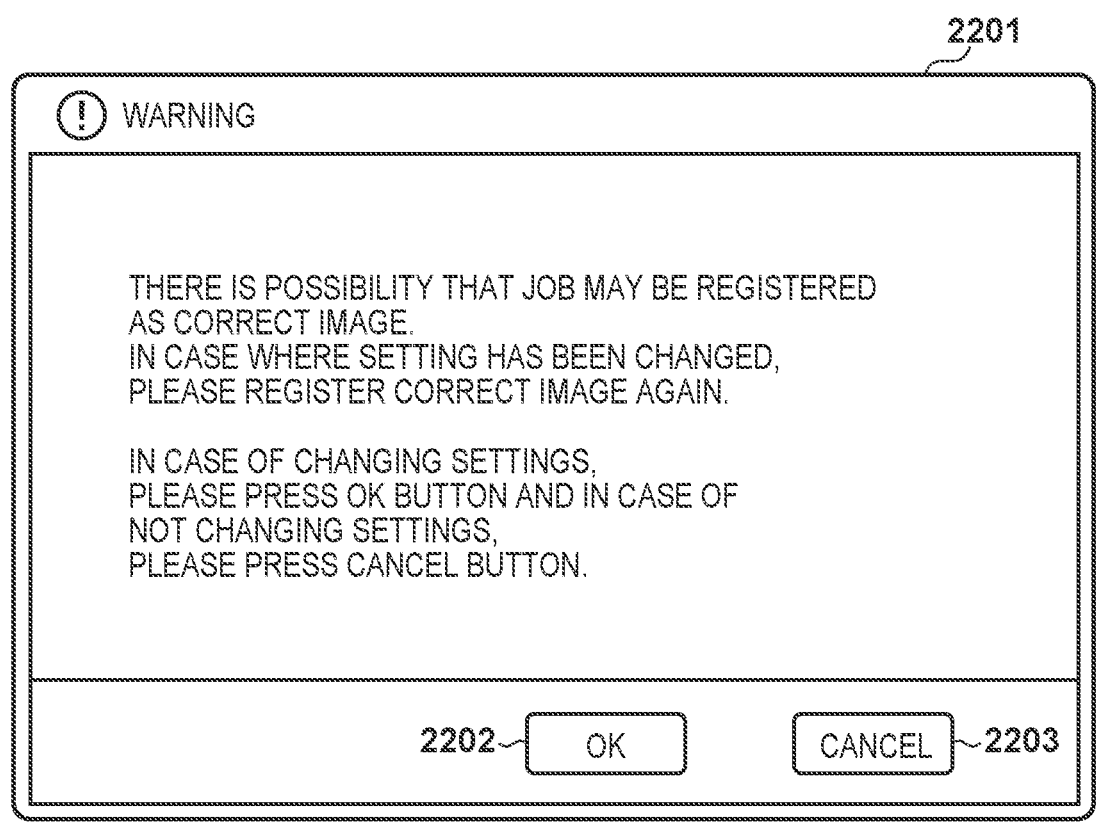
FIG. 22 is a view illustrating an example of a warning dialog box according to the embodiment.

In a case where one of the grayed-out setting items has been selected and a forced change has been instructed by the user, the CPU 208 displays a warning dialog box in step S2101. FIG. 22 illustrates an example of a warning dialog box 2201. It notifies the user that since there is a possibility that a job for which a setting change has been instructed may be registered as a correct image and that it is necessary to register a correct image again in a case of a setting change. Also, it may display that verification processing will be skipped this time. Note that the verification processing may be executed as is.

In step S2102, the CPU 208 determines whether or not an OK button 2202 of the warning dialog box 2201 has been pressed. If it is determined to have been pressed, the processing advances to step S2103, and the CPU 208 sets the verification mode flag that is stored in the memory 209 in association with a job from on to off. By this, the job is handled as a normal job rather than a job at a time of registering a correct image and it is possible to skip execution of verification processing. Meanwhile, in a case where a cancel button 2203 has been pressed, a screen before the warning dialog box 2201 was displayed (i.e., the print setting screen 2001) is returned to.

Next in step S2104, the CPU 208 returns to the print setting screen 2001 after closing the warning dialog box 2201 but sets the grayed-out items to be editable and, in step S2105, displays the print setting screen 2001 on the display 212. In other words, with regard to the items for which the settings have been forcibly changed, the setting values thereof are selected, and the other grayout setting items are displayed in a state in which the gray-out has been deactivated as in a state in the print setting screen 1501 of FIG. 15.

As described above, the verification system according to the present embodiment comprises a print setting unit configured to set one or more printing conditions, a printing apparatus configured to perform printing onto a sheet according to the set printing conditions, and a reading unit configured to read an image of a sheet. Also, the present verification system registers as a correct image for performing verification of a printed image an image that has been read in the reading unit from a sheet that has been printed by the printing apparatus and store print data and printing conditions that have been used in order to register the correct image. Furthermore, the present verification system, when performing printing using the stored print data, restricts editing by the print setting portion with regard to predetermined items of the printing conditions that correspond to the print data if setting is that in which verification of a printed material is performed. Also, the present verification system determines a defect in a read image by comparing the registered correct image and the read image which is an image that has been printed by the printing apparatus and read in the reading unit. By virtue of the present embodiment, with regard to the printing conditions that affect a verification result among the printing condition for when a correct image has been generated, it is possible to suitably print under the same condition an image to be verified and to properly cross-reference the image to be verified and the correct image.

Also, the present verification system displays the above predetermined items in a grayout in the print setting screen and, if the predetermined items that are displayed in a grayout are operated, displays a warning that it is necessary to register a correct image again in a case where the predetermined items have been edited. Alternatively, the present verification system controls the predetermined items that are displayed in a grayout to be inoperable. By this, it is possible to prevent a change of a printing condition by an erroneous operation or the like in print setting of a print job for which verification is performed.

Also, in the present verification system, it is possible, in a registration screen for registering a correct image, to display a read image and set one or more regions of that image as a skip region for which verification is not performed. Also, in a confirmation screen for displaying a verification result, in a case where it is determined as defective, a reason and a position of that reason on an image are displayed for each page for which verification has been performed. As described above, by virtue of the present embodiment, it is possible to provide a user-friendly operation system for verifying a printed material.

By virtue of the present invention, with regard to the printing conditions that affect a verification result among the printing condition for when a correct image has been generated, it is possible to suitably print under the same condition an image to be verified and properly cross-reference the image to be verified and the correct image.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-113192, filed Jun. 30, 2020, which is hereby incorporated by reference herein in its entirety.

What is claimed is:

1. A verification system comprising:
a printer which prints an image on a recording sheet;
a reader which reads the image printed on the recording sheet; and one or more controllers including one or more processors and one or more memories, the one or more controllers being configured to:
set a first print setting via a setting screen;
cause the printer to print an image based on the set first print setting, cause the reader to read the printed image, and register the read image as a correct image;
set a second print setting via the setting screen;
cause the printer to print a verification target image based on the set second print setting, cause the reader to read the printed verification target image, and verify the read image using the registered correct image; and
control the setting screen for the second print setting so that a predetermined print setting included in the first print setting cannot be edited on the setting screen for the second print setting.

2. The verification system according to claim 1, wherein the one or more controllers are also configured to display the predetermined item in a gray-out in a setting screen that is displayed on a display unit.

3. The verification system according to claim 2, wherein the one or more controllers are also configured to, if the predetermined item that is displayed in the gray-out is operated, cause a display unit to display a warning that in a case where the predetermined item is edited it will be necessary to register the correct image again.

4. The verification system according to claim 2, wherein the one or more controllers are also configured to control the predetermined item displayed in the gray-out to be inoperable.

5. The verification system according to claim 1, wherein the one or more controllers are also configured to store a flag that indicates whether or not to perform verification of a printed material, and
in a case where the stored flag indicates performing of verification, determine that setting is such that verification of a printed material is performed.

6. The verification system according to claim 1, wherein the one or more controllers are also configured to, in a case where registering the correct image, accept a setting by displaying on a display unit a setting screen that causes a user to set a number of sheets per copy of a print job for which to perform verification and a surface of a sheet on which to perform verification and causes the reader to read an image from a sheet printed by the printer in accordance with setting content.

7. The verification system according to claim 6, wherein the one or more controllers are also configured to display the image read by the reader and display on the display unit a registration screen that accepts a registration instruction from a user and, when a registration instruction is accepted via that registration screen, register that image as a correct image.

8. The verification system according to claim 7, wherein in the registration screen, it is possible to set one or more regions for which to skip verification in the image read by the reader.

9. The verification system according to claim 7, wherein in the registration screen, it is possible to display, switching a page of the image read by the reader.

10. The verification system according to claim 1, wherein the one or more controllers are also configured to display on the display unit a confirmation screen that displays a verification result, and
in the confirmation screen, a verification result is displayed for each page and in a case where determination of a defective image is made, a reason thereof and a position of that reason on an image are displayed.

11. The verification system according to claim 1, wherein the predetermined item of a printing condition for which editing is restricted is an item by which, in a case where a setting is changed, at least one of a direction of an image of a sheet to be printed, an order of pages to be printed, an appearance of color of an image to be printed, and enlargement/reduction of an image to be printed is changed.

12. The verification system according to claim 1, wherein in an item for which editing is not restricted, selection of at least a number of copies to be printed and a sheet feeding unit that feeds a sheet is included.

13. An information processing apparatus operable to be connected to a printing apparatus, the information processing apparatus comprising:
one or more memory devices that store a set of instructions; and
one or more processors that execute the set of instructions to:
set a first print setting via a setting screen;
set a second print setting via the setting screen; and
control the setting screen for the second print setting so that a predetermined print setting included in the first print setting cannot be edited on the setting screen for the second print setting.

14. A control method of a verification system that comprises a printer which prints an image on a recording sheet, and a reader which reads the image printed on the recording sheet, the method comprising:
setting a first print setting via a setting screen;
causing the printer to print an image based on the set first print setting, causing the reader to read the printed image, and registering the read image as a correct image;
setting a second print setting via the setting screen;
causing the printer to print a verification target image based on the set second print setting, causing the reader to read the printed verification target image, and verifying the read image using the registered correct image; and
controlling the setting screen for the second print setting so that a predetermined print setting included in the first print setting cannot be edited on the setting screen for the second print setting.

15. A method for controlling an information processing apparatus connected to a printing apparatus, the method comprising:
setting a first print setting via a setting screen;
setting a second print setting via the setting screen; and
controlling the setting screen for the second print setting so that a predetermined print setting included in the first print setting cannot be edited on the setting screen for the second print setting.

16. The verification system according to claim 1, wherein the predetermined print setting is at least one of a page range, single sided and double sided print settings, a sheet type, an orientation of printing, and a binding position.

17. The verification system according to claim 1, wherein the setting screen for the second print setting is capable of setting at least one of a number of copies, a sheet feeding unit, and a sheet type.

* * * * *